US011401167B2

United States Patent
Paulsen et al.

(10) Patent No.: US 11,401,167 B2
(45) Date of Patent: Aug. 2, 2022

(54) NITRATE PROCESS FOR MANUFACTURING TRANSITION METAL HYDROXIDE PRECURSORS

(71) Applicants: Umicore, Brussels (BE); Umicore Korea Ltd., Cheonan (KR)

(72) Inventors: Jens Paulsen, Cheonan (KR); Eric Robert, Olen (BE); Dirk Vanhoutte, Olen (BE); Daniël Nelis, Olen (BE); Randy De Palma, Olen (BE); Dae-Hyun Kim, Cheonan (KR)

(73) Assignees: UMICORE, Brussels (BE); UMICORE KOREA, LTD., Chungnam (KR)

( * ) Notice: Subject to any disclaimer, the term of this patent is extended or adjusted under 35 U.S.C. 154(b) by 352 days.

(21) Appl. No.: 16/492,721

(22) PCT Filed: Mar. 15, 2018

(86) PCT No.: PCT/EP2018/056567
§ 371 (c)(1),
(2) Date: Sep. 10, 2019

(87) PCT Pub. No.: WO2018/167224
PCT Pub. Date: Sep. 20, 2018

(65) Prior Publication Data
US 2020/0031682 A1    Jan. 30, 2020

Related U.S. Application Data

(60) Provisional application No. 62/471,575, filed on Mar. 15, 2017.

(30) Foreign Application Priority Data

Jun. 16, 2017    (EP) .................................. 17176339

(51) Int. Cl.
*C01D 1/20*    (2006.01)
*C01C 1/02*    (2006.01)
(Continued)

(52) U.S. Cl.
CPC .................. *C01D 1/20* (2013.01); *C01C 1/02* (2013.01); *H01B 1/08* (2013.01); *H01M 4/485* (2013.01);
(Continued)

(58) Field of Classification Search
CPC ........ H01B 1/08; H01M 4/0471; H01M 4/52; C01G 51/00; C01G 53/00; C01D 1/20;
(Continued)

(56) References Cited

U.S. PATENT DOCUMENTS 5,728,367 A     3/1998  Mao
6,773,487 B2 *  8/2004  Vanhoutte ............... C22B 11/00
                                                          75/744

(Continued)

FOREIGN PATENT DOCUMENTS

CN    102084013 A    6/2011
CN    102306765 A    1/2012
(Continued)

OTHER PUBLICATIONS

Zhang et al "An overview on the process and technologies for recycling cathodic active materials from spent lithium-ion batteries", J Mater Cycles Waste Manag (2013) 15:420-430.*
(Continued)

*Primary Examiner* — Mark Kopec
(74) *Attorney, Agent, or Firm* — NK Patent Law

(57) ABSTRACT

This invention relates to an industrial process of manufacturing hydroxide precursor for lithium transition metal oxide used in secondary lithium ion batteries. More particularly,
(Continued)

this process utilizes highly concentrated nitrate salts and is designed to mitigate waste production.

21 Claims, 9 Drawing Sheets

(51) Int. Cl.
H01M 4/485 (2010.01)
H01M 10/0525 (2010.01)
H01B 1/08 (2006.01)
H01M 4/02 (2006.01)

(52) U.S. Cl.
CPC .......... H01M 10/0525 (2013.01); *H01M 2004/028* (2013.01)

(58) Field of Classification Search
CPC .... C01C 1/02; C01C 1/10; C01C 1/12; B01D 53/56
See application file for complete search history.

(56) References Cited

U.S. PATENT DOCUMENTS

| | | | |
|---|---|---|---|
| 6,875,416 B1* | 4/2005 | Benz | H01M 4/525 423/594.15 |
| 2003/0039745 A1* | 2/2003 | Nanno | H01M 4/28 427/126.6 |
| 2009/0087746 A1* | 4/2009 | Kang | H01M 4/505 429/219 |
| 2011/0147679 A1* | 6/2011 | Inukai | H01M 10/54 423/625 |
| 2012/0009476 A1 | 1/2012 | Park et al. | |
| 2012/0028128 A1 | 2/2012 | Seino et al. | |
| 2013/0312254 A1 | 11/2013 | Kim et al. | |
| 2017/0305757 A1* | 10/2017 | Oshita | C01G 53/04 |

FOREIGN PATENT DOCUMENTS

| | | |
|---|---|---|
| EP | 2784166 A1 | 10/2014 |
| JP | S60198057 A | 10/1985 |
| JP | 2007534841 A | 11/2007 |
| JP | 2010245038 A | 10/2010 |
| JP | 201218925 A1 | 2/2012 |
| JP | 2013166661 A | 8/2013 |
| JP | 2015150521 A | 8/2015 |
| KR | 20130059029 A | 6/2013 |
| WO | 2005106053 A1 | 11/2005 |
| WO | 20091416175 A2 | 12/2009 |
| WO | 2011056548 A2 | 5/2011 |

OTHER PUBLICATIONS

Friedrich Hoppe, et al., "Recycling of Sodium Sulfate by High Temperature Metathesis with Hydrogen Chloride", Chemical Engineering & Technology, vol. 21, No. 2, 1998, pp. 165-168.

Kim, et al., "Effects of inorganic salts on the morphological, structural, and electrochemical properties of prepared nickel-rich Li[Ni0.6Co0.2Mn0.2]O2", Journal of Power Sources, vol. 268, 2014, pp. 349-355.

Khaled, K.F., "Electrochemical behavior of nickel in nitric acid and its corrosion inhibition using some thiosemicarbazone derivatives", Electrochimica Acta, Elsevier Ltd., vol. 55, 2010, pp. 5375-5383.

Clifford, I.L., et al., "The System Ammonia-Water at Temperatures up to 150° C. and at Pressures up to Twenty Atmospheres", Research Laboratory of I.C.I. (Alkali) Ltd., received Oct. 18, 1932, pp. 101-118.

Bauer, T., "Characterization of Sodium Nitrate as Phase Change Material", International Journal of Thermophysics, 2012, vol. 33, No. 91, pp. 91-104.

Bartholomew, R.F., "A Study of the Equilibrium KNO3(I) ⇌ KNO2(I)+1/2O2(g) over the Temperature Range 550-750°", The Journal of Physical Chemistry, vol. 70, No. 11, 1966, pp. 3442-3446.

Paniccia, F., et al., "Redox mechanisms in an ionic matrix. III. Kinetics of the reaction nitrite ion+molecular oxygen=nitrate ion in molten alkali nitrates", The Journal of Physical Chemistry, vol. 77, No. 14, 1973, pp. 1810-1813.

Stern, K.H., "High Temperature Properties and Decomposition of Inorganic Salts Part 3, Nitrates and Nitrites" Journal of Physical and Chemical Reference Data, vol. 1, No. 3, 1972, pp. 747-772.

Schultes, M., "Absorption of Sulphur Dioxide with Sodium Hydroxide Solution in Packed Columns" Chemical Engineering & Technology, vol. 21, 1998, pp. 201-209.

CNIPA; Office Action for Chinese Patent Application No. 201880017972.8 dated Jul. 29, 2020, 15 pages.

"General Chemistry" Inorganic Chemistry Teaching and Research Section, China University of Petroleum, China University of Petroleum Press, (Dongying, Shangdong), Dec. 2006, 5 pages.

ISA/EP; International Search Report and Written Opinion for International Patent Application No. PCT/EP2018/056567 dated May 8, 2018, 8 pages.

\* cited by examiner

NITRATE PROCESS FOR MANUFACTURING TRANSITION METAL HYDROXIDE PRECURSORS

CROSS-REFERENCE TO RELATED APPLICATIONS

This application is a U.S. National Stage application of International Patent Application No. PCT/EP2018/056567, filed on Mar. 15, 2018, which claims the benefit of European Patent Application No. 17176339.4, filed on Jun. 16, 2017, and U.S. Provisional Patent Application No. 62/471,575, filed on Mar. 15, 2017.

This invention relates to an industrial process of manufacturing hydroxide precursor for lithium transition metal oxide used in secondary lithium ion batteries. More particularly, this process utilizes highly concentrated nitrate salts, and is designed to mitigate waste production.

BACKGROUND OF THE INVENTION

Since the first commercial success of lithium-ion battery using carbon as anode and lithium cobalt oxide ($LiCoO_2$) as cathode in 1992 by Sony, rechargeable lithium-ion batteries have been the most promising chemical-electrical energy converters for portable electronic devices. Today, this technology penetrates large-format applications that include green transportation systems such as electric vehicles (EVs), hybrid EVs (HEVs), and stationary storage applications. The global market for lithium ion batteries is expected to cross $30 billion by 2020. The increasing market penetration in large cell applications demands higher power density, higher energy density, excellent cycling performance, and more safety.

One of the essential elements determining the performance of cells is the active material of the positive electrode. For decades, continuous efforts have been devoted to develop transition metal oxide based compounds that possess favorable crystalline structures for the transportation of the Li+ ions. Promising candidates include the $LiCoO_2$ layered structure, the $LiMn_2O_4$ spinel structure, and the $LiMPO_4$ (with M=Fe, Mn, etc.) olivine family. Layered materials prevail over spinel oxides and olivine materials with the advantage of high-energy, which is in high demand in automotive application. However, typical layered materials like $LiCoO_2$ face the issue of high costs due to the scarcity of Co; there are moreover safety issues as delithiated $Li_{1-x}CoO_2$ exhibits exothermic reactions with organic electrolytes at elevated temperature. Both issues limit the massive usage of $LiCoO_2$ layered material in large cells. An alternative solution is the substitution of Co by Mn and Ni in $LiCoO_2$ layered materials. This results in a lithium, nickel, manganese, and cobalt oxide layered material, known as "NMC". Manganese and nickel are found in abundance in nature, and are much cheaper than cobalt. Besides, substitution by manganese and nickel brings improved thermal and chemical stability, such as lower metal dissolution and higher capacity retention. Thus, the excellent performance together with low costs can pave the way for NMC materials in the emerging utilization of lithium ion batteries in large format application, especially in the automotive market.

NMC materials crystalize in space group R-3m, with "ABCAABC" type close packing, where the crystalline structure is regarded as having the "O3" structure. The transition metal ions occupy alternating layers in octahedral sites of the structure. In NMC compounds, nickel contributes to the majority of the electrochemical activity, while cobalt can play an active role only at high potentials. The manganese does not take part in the redox reaction, but stabilizes the layered structure. Performance of NMC materials varies with composition, which is generally categorized and named after the nickel, manganese, and cobalt content. NMC based materials are typically designated as "111" when the composition of transition metals (referred to as M in the formula of $LiMO_2$) is $Ni_{1/3}Mn_{1/3}Co_{1/3}$, or "532" when M is $Ni_{0.5}Mn_{0.3}Co_{0.2}$, or "622" when M is $Ni_{0.6}Mn_{0.2}Co_{0.2}$.

NMC materials are generally prepared by solid-state reactions, wherein a source of lithium, for example $Li_2CO_3$, is blended with a mixed Ni—Mn—Co precursor, and the blend is fired in an oxygen-containing atmosphere, for example air, to yield the final lithium transition metal oxide powder. It is known that NMC cannot be prepared from non-mixed precursors. The use of non-mixed precursors, for example NiO, $Mn_2CO_3$, and $Co_3O_4$, indeed results in poor cathode performance. In order for the cathode to work well in a battery, the Ni, Mn, and Co cations need to be well mixed at atomic scale. In the standard process, this is achieved by using mixed transition metal precursors, where the transition metal atoms are well mixed at nanometer scale. For NMC cathode preparation, a mixed metal hydroxide or oxy-hydroxide is typically used as precursor. At the industrial scale, mixed hydroxide precursors are e.g. manufactured by a co-precipitation process comprising the steps of preparing a mixed solution containing nickel sulfate, manganese sulfate, and cobalt sulfate, to which a NaOH solution, and a $NH_4OH$ solution are added.

Metal sulfate solutions are generally prepared by a hydrometallurgical process, where metal bearing ores are refined and subsequently leached in sulfuric acid under pressure at high temperature. During leaching, nickel, manganese, and cobalt, in the form of metal, oxide or carbonate, will react with the acid, thereby producing a metal sulfate solution. During the co-precipitation of mixed hydroxide precursors, ammonia may be added as a chelating agent. Ammonia complexes are formed, increasing the metal solubility and thus decreasing the nucleation rate during precipitation. This facilitates the formation of the desired dense hydroxide having particles of more than 10 µm.

The above-described state of the art "sulfate process" still presents many issues.

Firstly, any ammonia that is present in the precipitation process remains in the filter solution. The discharge of nitrogen containing waste water is generally limited for environmental reasons. Examples of government regulations are the 2-10 mg/L limit on total nitrogen discharge according to European policies, the 5-8 mg/L limit on ammonia nitrogen and 15-20 mg/L limit on total nitrogen in China, and the 60 ppm on total nitrogen in Korea. As the ammonia content resulting from the co-precipitation process can be several grams per liter, the waste water cannot be directly released to the environment. The waste water has therefore to be treated to remove, and preferably to recycle, the ammonia.

Generally, the ammonia solution can be recycled using an air stripping or steam stripping process in a dedicated stripping tower that is similar to a gas scrubbing equipment. Installation and operation costs are considerable. With air stripping, gases entering from the bottom of the tower strip ammonia from the preheated ammonia-laden water that enters on top. The treated solution is collected at the bottom of the stripper, while ammonia-laden gases flow out of the tower at the top, and are collected for further treatment in an absorber. As the ammonia recycling process is capital intensive, it is desired to cut down the investment by using a smaller ammonia tower or by reducing the amount of waste water.

Secondly, in the co-precipitation process, the concentration of metal sulfates is limited to a typically 2 mol/L only, due to the low solubility of these salts in water at room temperature. Thus, when producing a certain amount of metal hydroxide precursor, large amounts of waste water will be generated. During recycling of ammonia, the large amount of waste water from the co-precipitation process lowers the concentration of ammonia, which requires a large and thus expensive ammonia tower to strip ammonia from waste water.

According to known processes, the co-precipitation can take place in a continuously stirred tank reactor (CSTR), wherein the feeds are continuously pumped, and where the products are recovered from the solution overflow at the top. It is known that the morphology in general, and especially the particle size, of the so prepared metal hydroxide precursor relates to the physical and electrochemical properties of the final NMC products. A certain minimum residence time is needed to ensure a proper morphology. The throughput of the co-precipitation process can be thus evaluated by the following equation:

$$\text{Throughput}\left(\frac{\text{mol}}{\text{hour}}\right) = \frac{\text{Volume of reactor tank (L)}}{\text{residence time (hour)}} \times \text{concentration of product}\left(\frac{\text{mol}}{\text{L}}\right)$$

Herein, the concentration of product is proportionally determined by the concentration of the metal sulfate solution. Thus, with fixed reactor size and residence time, the throughput is limited by the solubility of metal sulfate in water, which is low. The throughput can be increased by enlarging the tank, but this would push up the cost. This is another disadvantage of the sulfate process.

Thirdly, in the sulfate process, the waste water coming from the reactor includes not only ammonia, but also sodium sulfate with a concentration of 1-2 mol/L. Theoretically, and according to the precipitation reaction $$MSO_4 + 2NaOH \rightarrow M(OH)_2 + Na_2SO_4$$

the production of each kilogram of NMC precursor entails about 1.3 kg of sodium sulfate. Generally, sodium sulfate is merely dumped with the waste water, which is not a sustainable approach. This could even be unacceptable when considering the legal limits on the discharge of sodium sulfate solution. In China for instance, the limit amounts to 600 mg/L of sulfate.

The waste water has therefore to be treated to strip sulfate before being dumped. The most common method is lime precipitation, where addition of hydrated lime precipitates most of sulfate as gypsum; the residual level of sulfate is approximately 2000 mg/L, which can be further recycled by a cost effective sulfate removal (CESR) process.

Even if such a recovery method is cost effective, it still adds costs to the overall process, while the recycled calcium sulfate cannot be reused in the manufacture of NMC precursor. In "Chem. Eng. Technol. 21 (1998) 2", a recycling process for sodium sulfate is proposed to convert sodium sulfate to sodium hydroxide and sulfuric acid in two steps, leading to the recovery of a soda solution and concentrated sulfuric acid. The recovery comes with a high energy consumption and involves complex operations.

Generally, due to the low cost of sulfuric acid and of NaOH, there is little financial incentive to recover NaOH from recycled $Na_2SO_4$. The generation of waste is therefore a general issue of the sulfate precipitation route.

Instead of mixed metal hydroxide precursor, mixed carbonate precursors can also be used to produce NMC cathode materials according the schematic reactions $$MSO_4 + Na_2CO_3 \rightarrow MCO_3 + Na_2SO_4 \text{ or}$$

$$MSO_4 + 2AHCO_3 \rightarrow MCO_3 + A_2SO_4 + CO_2 + H_2O \text{ (with } A = Na \text{ or } NH_4).$$

These carbonate precursors, when using sulfate salts, have the same waste issue of creating 1 mole of sulfate waste per mole of $M(OH)_2$ precursors. Furthermore, due to the lower solubility of carbonate compared to NaOH, still more waste water is generated.

Other potentially alternative co-precipitation methods include the "nitrate process", the "chloride process" and the "acetate process", where these method respectively start from nitrate anions, chloride anions, and acetate anions instead of sulfate anions in the co-precipitation (cf. patent publication CN102306765A). As described in "Journal of Power Sources (2014), 268, 349-355", when using metal nitrate salts in the same co-precipitation process as metal sulfate, similar results in the aspect of precursor shape and size can be obtained. Also in this nitrate process, the addition of ammonia acts as a chelating agent to control the growth of precursor particles. This nitrate process is not attractive for the mass production of NMC precursors in industry, as the price of transition metal nitrates (or of the nitric acid to prepare them by leaching the metals) is significantly more expensive when compared to the corresponding sulfates. Furthermore, the waste water from this nitrate process contains nitrate salts, which are toxic to aquatic species and hazardous to the environment. The presence of highly concentrated sodium nitrate entails a risk of fire and explosion on contact with a reducing agent. In addition, if there is a residue of nitrate salts in the NMC precursors, $NO_x$ gases would be generated upon normal firing of NMC products. Such gases are toxic and harmful to human beings and environment. Accordingly, preparation of NMC precursor through this nitrate process is not suitable for industrial application, unless above issues are solved.

KR20130059029 mentions a co-precipitation process from a highly concentrated metal nitrate solution of up to 8 mol/L, aiming at improving the production efficiency compared to the typical co-precipitation from a sulfate solutions of 2 mol/L only. Taking the higher price of nitrates compared to sulfates into the consideration, the above document suggests to add sulfate solution to the nitrate solution to cut down the production costs. This approach does however not solve the issues such as the formation of harmful residues. The feasibility of the process can moreover be questioned as the highly concentrated mixture in the co-precipitation reactor could likely result in a highly viscous fluid, and even in unwanted crystallizations.

Currently, the automotive lithium battery market grows fast, which pushes up the production capability for lithium batteries and of the cathode NMC materials within the batteries. Thus the waste disposal and energy consumption during manufacture of NMC cathode materials becomes increasingly a major point of attention. Governments have been trying to regulate or even legislate on the production process of lithium ion batteries, enforcing a waste-free, and ecological-friendly manufacturing process. A strong need to develop processes to produce the cathode materials used in these batteries by a more sustainable process is therefore created. It is especially important to reduce the amount of waste water, and of its $Na_2SO_4$ content. Alternative sustainable co-precipitation processes are strongly needed.

Therefore, this invention aims at providing a sustainable and economical solution to commercial production of NMC hydroxide or carbonate precursors, with special focus to waste minimization and on energy-savings.

SUMMARY OF THE INVENTION

Figure 1:
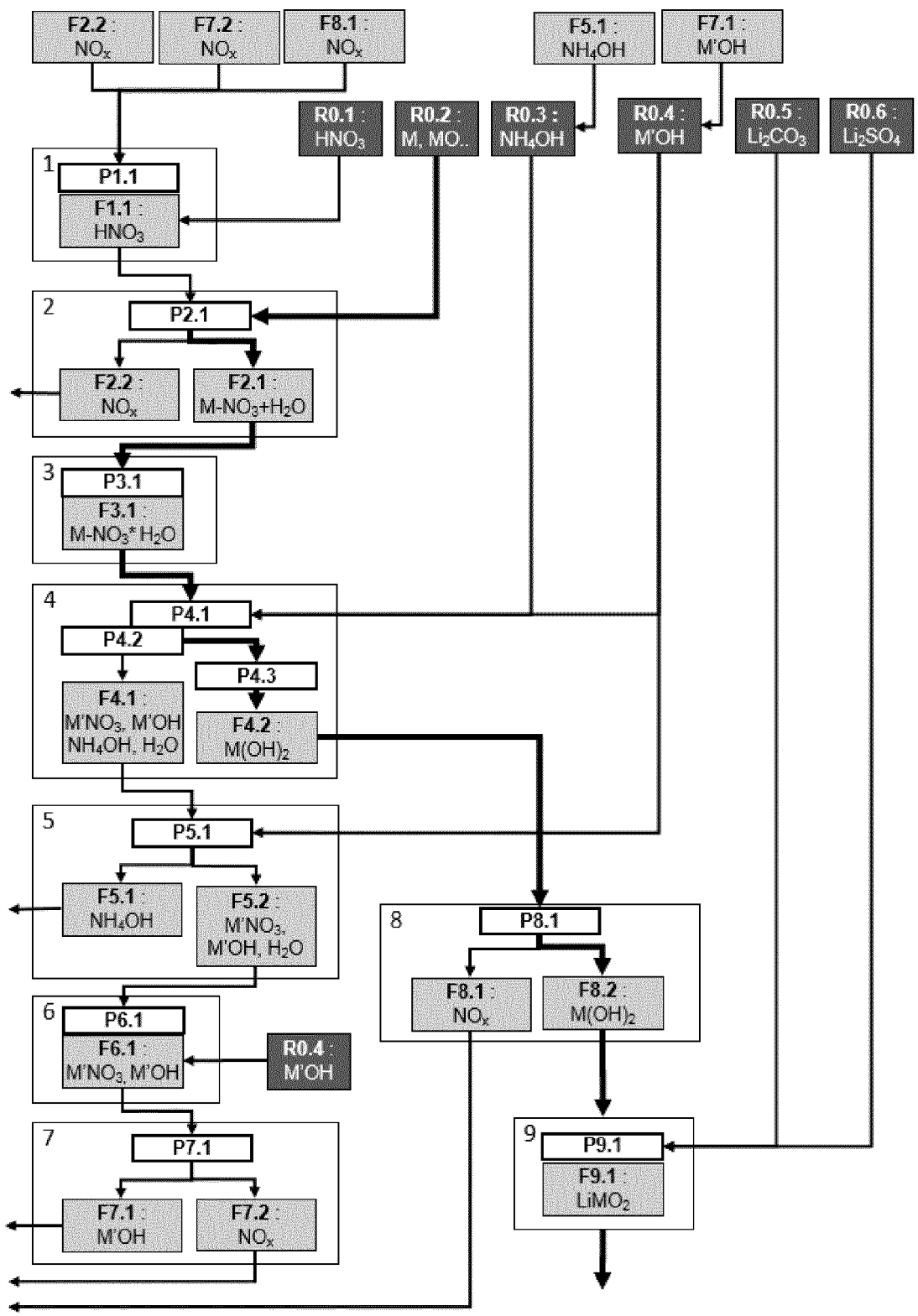
FIG. 1. Flow chart of the process for preparing a lithiated transition metal oxide The graph contains processes (P), material flows (F) and Raw materials (R). A closed loop approach is applied which allows to replace raw materials Chemical formulas are for "ease to read" only and will be specified in the text FIG. 2. McCabe-Thiele diagrams for distillation of ammonia-water system: a) low concentration of ammonia in feed and b) high concentration of ammonia in feed FIG. 3. Phase diagram of NaOH—$Na_2O$ system, given in "C.R. Acad. Sc. Paris 262, Serie C, 1051-1054, 1966"

This invention discloses a process to produce lithiated transition metal oxides which can be used as cathodes in rechargeable batteries. Contrary to prior art, a closed loop approach is applied which allows to reduce the consumption of raw materials and creates less waste. The process is schematically displayed in FIG. 1 and Table 1.

The inventive process includes a number of steps, some of them being optional:

1. Recovery of $NO_x$ waste streams from later steps for the preparation of nitric acid;

2. Using recycled nitric acid from later steps, or the nitric acid recovered in step 1, to prepare a transition metal nitrate solution by leaching suitable transition metal or their compounds. The $NO_x$, if generated, is preferably recycled to step 1 to form nitric acid;

3. Optionally extracting water from the transition metal nitrate solution to prepare a higher concentrated transition metal nitrate, further referred to as brine;

4. Preparing a mixed transition metal intermediate by a co-precipitation reaction. A flow of transition metal nitrate or brine as well as a flow of a base solution (e.g. NaOH) is fed to a precipitation reactor. Optionally, a complexing agent (e.g. $NH_4OH$) is added as well to the reactor. The transition metal nitrate has a high concentration, typically more than 2 mol/L. The obtained slurry is separated resulting in a filter solution containing alkali nitrate (and ammonia if ammonia was used as complexing agent) and a solid product, which is obtained after washing and drying, resulting in a mixed transition metal intermediate. In some implementations, the mixed transition metal intermediate contains residual nitrate;

5. Recycling ammonia from the filter solution from step 4 if ammonia was used as complexing agent during precipitation;

6. Evaporating water from the filter solution to increase its alkali nitrate concentration;

7. Treating the concentrated alkali nitrate solution from step 6 in a suitable way to recover $NO_x$, and, optionally, recover an alkali oxide or hydroxide compound. The $NO_x$ is recycled to step 1 to form nitric acid, and the alkali compound is recycled to step 4 as a base for the co-precipitation reaction;

8. Optionally removing the residual nitrate from the mixed transition metal intermediate by a heat treatment (roasting), resulting in a mixed transition metal precursor (e.g. a transition metal oxy-hydroxide or oxide) essentially free of nitrate. A waste stream of $NO_x$ is generated, which is either discarded, or recovered in step 1, or used for the preparation of nitric acid, which is recycled to step 2;

9. Preparing a lithiated transition metal oxide which is a cathode material or an intermediate product for the preparation of cathode materials for rechargeable lithium batteries. The mixed transition metal precursor from step 7 or 8 is blended with a source of lithium (e.g. $Li_2CO_3$), optionally a sulfur containing additive is added and the blend is fired resulting in a lithiated transition metal oxide.

TABLE 1

Schematic overview of the process

| Flow/product in | | Process name | | Flow/product out |
|---|---|---|---|---|
| | | 1. $HNO_3$ regeneration | | |
| F2.2 | First $NO_x$ | P1.1 | Nitric acid recycling | F1.1 | Nitric acid (concentrated) |
| F7.2 | $NO_x$ | | | | |
| F8.1 | $NO_x$ | | | | |
| | | 2. Metal leaching | | |
| R0.1 | Metals and/or metal compounds (Metal, oxide, carbonate, etc.) | P2.1 | Preparation of metal nitrate | F2.1 | Solution containing metal nitrates |
| R0.2 | Fresh $HNO_3$ | | | F2.2 | First $NO_x$ stream |
| F1.1 | Recycled $HNO_3$ | | | | |
| | | 3. Nitrate concentration | | |
| F2.1 | Solution containing metal nitrates | P3.1 | Water evaporation | F3.1 | Brine containing metal nitrates |

TABLE 1-continued

Schematic overview of the process

| Flow/product in | | Process name | | Flow/product out | |
|---|---|---|---|---|---|
| *4. Precursor precipitation* | | | | | |
| F2.1/ F3.1 | Solution containing metal nitrates or Brine containing metal nitrates | P4.1 | Precipitation reaction | | Slurry |
| R0.3/ F5.1 | Optional ammonium compound | | | | |
| R0.4/ F7.1 | Alkali hydroxide or carbonate | | | | |
| F5.2/ F7.1 | Recycled alkali metal hydroxide | | | | |
| | Slurry | P4.2 | Separation (e.g. filtering) | F4.1 | Filter cake Solution containing alkali nitrates Residual ammonia, alkali metal hydroxide |
| | Filter cake | P4.3 | Washing and drying | F4.2 | Solid phase containing the metal-bearing precursor Residual nitrates |
| *5. Ammonia recovery* | | | | | |
| F4.1 | Solution containing alkali nitrates | P5.1 | $NH_4OH$ stripping | F5.1 | Ammonium compound e.g. $NH_4OH$ to be reused in step 4 |
| R0.4/ F7.1 | Alkali metal hydroxide | | | F5.2 | Ammonia free solution containing alkali nitrates May still contain traces of $NH_4OH$ |
| *6. Alkali nitrate concentrating* | | | | | |
| F5.2 | Solution containing alkali nitrates | P6.1 | Water evaporation | F6.1 | Brine containing alkali nitrates Concentrated melt or salt Residual alkali hydroxide |
| R0.4/ F7.1 | Optional: alkali metal hydroxide | | | | |
| *7. Alkali nitrate decomposition* | | | | | |
| F5.2/ F6.1 | Solution containing alkali nitrates or Brine containing alkali nitrates | P7.1 | Suitable decomposition reaction | F7.1 | Solid or liquid phase containing the alkali |
| | | | | F7.2 | Second $NO_x$ stream |
| *8. Precursor roasting* | | | | | |
| F4.2 | Solid phase containing the metal-bearing precursor | P8.1 | Heat treatment | F8.1 | Third $NO_x$ stream |
| | | | | F8.2 | Solid phase containing the metal-bearing precursor Mixed transition metal precursor basically $NO_3$ free |
| *9. Lithiation* | | | | | |
| F8.2 | Solid phase containing the metal-bearing precursor | P9.1 | Blending, firing | F9.1 | Cathode material for use in secondary lithium-based batteries Optionally: fourth $NO_x$ stream |
| R0.5 | Source of lithium e.g. $Li_2CO_3$ | | | | |
| R0.6 | Source of sulfur or chlorine | | | | |

Description of Step 1: Nitric Acid Recycling

Due to the high cost of nitric acid, and due to the environmental impact of residual nitrate in waste water or of $NO_x$ in air, it is preferred to collect all nitrates in the waste water and all $NO_x$ in the gas, and to use those to recover as much as possible of the nitric acid consumed in the metal leaching process. Industrial processes to prepare concentrated nitric acid $HNO_3$ from $NO_x$ are known and will be described below. One important issue is that oxygen and nitrogen are the thermodynamically stable species, not $NO_x$.

However, the nitric acid recovery needs $NO_x$ as input. Reactions leading to $N_2$ will thus reduce the fraction of nitric acid that can be recovered.

For the industrial production of $HNO_3$, $NO_x$ gas, generated by combustion of $NH_3$, is pressurized and sent to an absorption tower and mixed with pressurized air. The absorption tower constructed as a stack of absorption plates, the absorption plates are separated by an empty gas space. Gas and liquid flow counter-currently.

$NO_x$ gases (F2.2, F7.2 and F8.1) generated during metal leaching (P2.1), alkali nitrate decomposition (P7.1) and precursor roasting (P8.1) can be recycled by standard industrial process (P8.1) into nitric acid. $NO_x$ gas would be sent to an absorption tower for the purpose of recycling $NO_x$ gases into nitric acid, where $NO_x$ gases are oxidized by $O_2$ and $H_2O_2$ to nitric acid according to the reactions:

$$2NO+O_2 \rightarrow 2NO_2 \qquad (EQ1)$$

$$NO+NO_2 \rightarrow N_2O_3 \qquad (EQ2)$$

and, $$N_2O_3+H_2O \rightarrow 2HNO_2 \qquad (EQ3)$$

$$HNO_2+H_2O_2 \rightarrow HNO_3 H_2O \qquad (EQ4)$$

A concentration of around 10-14 mol/L of nitric acid can be achieved by the recycling process (P1.1) using a gas multistage absorption tower. The recycled nitric acid (F1.1) can be continuously re-injected into the metal leaching (P2.1) reactor to form a closed loop.

At least the $NO_x$ from the steps of metal leaching and of nitrate decomposition is used for the synthesis of nitric acid. This will result in a nitric acid recovery yield of more than 50%, preferably more than 70%, and more preferably of more than 90%. In addition, the $NO_x$ from the steps of precursor roasting and lithiation can also be used. This will result in a total nitric acid recovery yield of more than 90%, preferably more than 95%, and more preferably more than 99%.

Description of Step 2: Metal Leaching

During metal leaching (P2.1), nickel, manganese, and cobalt metals or their compounds (R0.2) can be dissolved into nitric acid (F1.1) to produce a metal nitrate solution (F2.1). $H_2$, NO and $NO_2$ may be generated during this step, according to the equations:

$$M+2HNO_3 \rightarrow M(NO_3)_2+H_2 \qquad (EQ5)$$

$$2M+4HNO_3+O_2 \rightarrow 2M(NO_3)_2+2H_2O \qquad (EQ6)$$

$$M+4HNO_3 \rightarrow M(NO_3)_2+2NO_2+2H_2O \qquad (EQ7)$$

$$3M+8HNO_3 \rightarrow 3M(NO_3)_2+2NO+4H_2O \qquad (EQ8)$$

wherein M can be one or more from Ni, Mn, Co. $H_2$ is not a desirable byproduct as it affects the process safety. The addition of $O_2$ could suppress the formation of $H_2$. With nitric acid, it is partially suppressed as nitric acid also acts as an oxidation agent; both NO and $NO_2$ are typically formed.

The leaching step is not limited to the equations above. If, for example, an oxide precursor is available, the leaching could be performed without generation of $NO_x$ gas. For example:

$$MO+2HNO_3 \rightarrow M(NO_3)_2+H_2O \qquad (EQ9)$$

There is a wide variety of metal precursors possible. It is, for example, also possible to use carbonate precursors, or hydroxide precursors, or precursor with a higher oxidation state (e.g. oxy-hydroxides, or higher oxides). For example:

$$MCO_3+2HNO_3 \rightarrow M(NO_3)_2+CO_2+H_2O \qquad (EQ10)$$

When dealing with a higher oxide, a reducing agent may be needed, e.g. a metal in metallic form:

$$2MOOH+6HNO_3+M \rightarrow 3M(NO_3)_2+4H_2O \qquad (EQ11)$$

$NiCO_3$, NiO, MnO, $MnCO_3$, or $MnO_2$ will be suitable choices, as well as pure Ni metal or pure Mn metal if they are commercially interesting. Since there should be no $H_2$ formation using pure metallic Co, this would be a good choice for the leaching process. If the formation of $H_2$ is successfully suppressed according to the reactions in EQ7 or EQ8, the $NO_x$ gases are then preferably used in the nitric acid recycling (P1.1) as described above. The metals forming the precursor can be leached all at the same time, or they can be leached separately and be mixed in a later stage.

Some $NH_3$ may be produced as a by-product of the leaching.

In an industrial-scale metal leaching process, elevated temperatures (e.g. 80° C.) can facilitate the dissolution of metal. In addition, elevated pressures also tend to increase the rate of NO oxidation (EQ1) and thus the rate of regeneration of $NO_x$ to $HNO_3$. Besides, it is advisable to add nitric acid in portions to allow the reactions to proceed in a controlled manner.

The concentration of the nitric acid (F1.1) used for the leaching is preferred to be high to reduce the production cost and to lift the efficiency of the leaching process. Commercial nitric acid with a concentration of 68 wt. % is widely used as this is the azeotropic composition with water. It has a boiling point of 395 K, and cannot be further concentrated by distillation. Considering that recycling of $NO_x$ gases can provide nitric acid with a concentration of 10-14 mol/L (50 to 65 wt. %), the nitrate concentration in the metal leaching process will reach 3-7 mol/L, depending on the exact reaction scheme.

"Electrochimica Acta 55 (2010) 5375-5383" suggest that concentrated $HNO_3$ could passivate Co and Ni, and block the dissolution of metals. It has however been found that no passivation of metals occurs when using a moderate excess of nitric acid with a concentration of more than 60%, where "moderate excess" refers to a molar ratio of nitric acid to metal of between 1 and 2. It is also advisable to apply heat to de-passivate metals. For example, heating to above 80° C. avoids the passivation on Ni. In theory, concentrated nitric acid is quite oxidative, so that undesirable oxidation of $Co^{2+}$ to $Co^{3+}$ may take place during metal leaching. Fortunately, in the absence of complexing agents, $Co^{3+}$ species is not stable in water. Thus, commercial nitric acid with a concentration 50% and even up to 68%, will not cause the aforementioned problems of passivation or undesired oxidation.

The concentration of the metal nitrate feed (F2.1) after leaching depends on the concentration of the nitric acid (F1.1) used in metal leaching process and the exact reaction involved. When using 10 mol/L nitric acid, the obtained metal concentration will be around 5 mol/L. Equation EQ5 or 6 will result in a higher concentrations than EQ8. It is observed that at room temperature, the highest feasible total metal concentration is around 4 mol/L. Under such conditions, there is no crystallization of nitrate salts, and the viscosity remains suitably low.

Description of Step 3: Nitrate Concentration

For an efficient precipitation (P4.1), i.e. to achieve a high processing throughput, it is desired to further increase the concentration of the transition metal nitrate feed (F2.1). This is typically achieved by water evaporation (P3.1) of the obtained $M(NO_3)_2$ solution (F2.1), eventually resulting in a brine or a molten salt (F3.1). The higher the concentration, the higher will be the throughput during the precipitation reaction; however too high a concentration might create issues during precipitation like re-crystallization if the temperature of the reactor and pumps etc. is not kept above the melting point of the brine or of the molten salt. Preferably, the metal nitrate solution has a transition metal concentration of 4-8 M, as will be described below.

The melting point of the brine depends on its metal concentration and composition. If the concentration is too high, then the solution will freeze at relatively high temperature. For a composition corresponding to e.g. a Ni:Mn:Co ratio of 6:2:2, the nitrate brine melts at about 50° C. if the concentration is 5.6 mol/L, and at about 85° C. if the concentration is 8 mol/L. If the concentrations at a given temperature is above a certain limit, then the solution becomes viscous and may even crystallize.

To obtain a high throughput during the precipitation reaction (P4.1), and generally to reduce the cost of the later process steps, a very high concentration of the nitrate brine is preferred.

Normally, one would expect that high concentrations would necessitate to keep the whole apparatus (pipes, pumps, . . . ) at an elevated temperature to avoid failure due to crystallization. Though perfectly feasible, this would increase cost and complexity, especially during the precipitation step (P4.1). When using 8 mol/L metal nitrate brine, the pumping system including pipelines would have to be kept at sufficient high temperature, for example 85° C., to remain above the melting point and thus to guarantee that the brine will flow through the pipes into co-precipitation reactor.

It has however been observed that the metal nitrate brine (F3.1) shows a shear-thinning behavior, which means that its viscosity decreases when the shear rate increases, so that the external forces, such as pumping, greatly facilitate the flow of the brine.

It has also been observed that the saturated metal nitrate brine can be super-cooled. That means that this brine will not easily recrystallize, even as the temperature is below its melting point (freezing point); this is especially true when sheer is applied to the melt.

These two observations allow for a preferred embodiment, wherein the super-cooled (or over-saturated) metal nitrate feed (F3.1) is pumped through pipes at room temperature.

In such an embodiment, 8 mol/L of metal nitrate brine is heated to 80° C. and kept agitated during cooling. The brine can be cooled down without re-crystallization, and it is only when a temperature of 25° C. is reached that the viscosity of brine suddenly increases significantly. The large hysteresis during cooling is explained by the super-cooling property of the brine. This property will be described more in Example 1. Based on this property, the introduction of super cooled metal nitrate brine will allow to reduce cost of the precipitation (P4.1) as the reactor set-up can be designed simply without need for excessive heating of reactor, pumps and pipes.

If during the leaching step (P2.1) according reaction EQ5, concentrated nitric acid (F1.1) of 10 mol/L is used to leach the metals, then the concentration of metal in solution (F2.1) is limited to about 5 mol/L. This is much higher than the prior art of sulfate based leaching. It can be desirable to further increase the throughput of the co-precipitation process (P4.1). This can be achieved by further concentrating the metal nitrate to achieve nitrate brines (F3.1) containing 8 mol/L of metal. A standard industrial process, which is e.g. used for the de-salinization of sea-water, can be employed. High energy efficiency can be achieved, with an energy consumption of approximately 90 MJ per 1 m³ of water, which is almost 25 times less than using single stage distillation.

Description of Step 4: Precipitation

During the precipitation process (P4.1), the above prepared metal nitrate brine (F3.1) is pumped into a continuous stirring tank reactor (CSTR), or into another type of reactor. At the same time, an alkali hydroxide solution (R0.4) is introduced into the reactor so as to maintain the pH of the whole metal salt solution at a value of 10 to 13.

An ammonia solution (R0.3) can be introduced optionally, acting as complexing agent. Instead of ammonia, other complexing agents can be used. Examples are ammonium salts, oxalate salts etc. The flow rates and the temperature should be controlled according to the state of the art. The precipitation can be performed batch-wise or continuously, e.g. using a CSTR. Alternatively, the process be can be repeated (e.g. with intermediate decanting), or ran semi-continuously (e.g. with continuous decanting).

It is observed that a suitable particle shape and size of the NMC precursors (F4.2) is obtained starting from the aforementioned highly concentrated metal nitrate brines (F3.1). A more detailed description is provided in Example 2. As discussed above, a big advantage of using a highly concentrated metal nitrate brine (F3.1) is the high throughput of the transition metal precursor (F4.2) production. Compared to the typical concentration of metal sulfates of 2 mol/L, metal nitrates brines of 4-8 mol/L or even higher can be used, so that the throughput of the nitrate process (P4.1) can be at least two times higher than with the standard sulfate process, while using same reactor and the same residence time.

In a conventional precipitation, a preferred alkali hydroxide precursor (R0.4) is sodium hydroxide NaOH. NaOH is highly soluble in water and is cheap. Alternatively other alkali hydroxides like LiOH, KOH, or carbonates or bicarbonates can be used; however either the cost is higher or the solubility is lower. In the precipitation process (P4.1), the preferred bases (R0.4) are lithium hydroxide, sodium hydroxide, and potassium hydroxide.

When lithium hydroxide is used as a base solution, any residual Li in the metal hydroxide (F4.2) might not need to be washed away since external additional Li should be added anyway in the lithiation step (F9.1). Up to 50% of the total lithium nitrate formed during the co-precipitation step could be tolerated in the product going to the lithiation reaction (P9.1). Schematically:

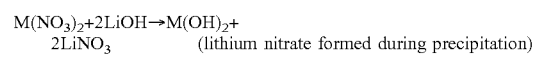

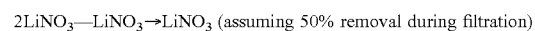

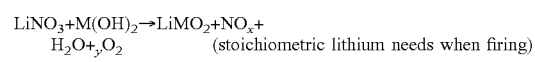

The main drawback of using lithium hydroxide is its low solubility compared to sodium hydroxide, which requires the precipitation step to be performed using a slurry comprising solid LiOH if one wants to keep the concentration of the obtained nitrate filtrate as high as possible. In addition, $NO_x$ management would be required during the lithiation step (P9.1) if lithium nitrate is used a lithium source.

U.S. Pat. No. 5,728,367 suggests a lithiation process using lithium nitrate as a lithium source to synthesize lithium metal oxide. In this process, $NO_x$ is formed as a byproduct, and lithium metal oxide as a final product, as a result of the reaction between the metal hydroxide and lithium nitrate. $NO_x$ is recycled to form $HNO_3$ which is used for the preparation of lithium nitrate from lithium hydroxide. The lithium nitrate is used in lithiation step again. According to the present disclosure, a better approach is provided, since the nitric acid (F1.1) is used in the leaching step (P2.1), so that a closed loop approach from metal to lithium metal oxide is rendered possible.

Sodium hydroxide provides for a high solubility and low cost, which allows for a simple process with a high throughput. However, since the residual Na in the metal hydroxide (F4.2) should be very low, the filtrate during the filter/washing step (P4.3) must be separated and the metal hydroxide F4.2 must be washed. KOH is similarly suitable as NaOH; however it is more expensive and has a lower solubility. Alternatively, KOH could be recovered from the waste $KNO_3$ (F6.1) by alkali nitrate decomposition (P7.1).

Preferably, a high concentration of the alkali hydroxide solution (R0.4) is chosen in order to reduce the amount of water in the filter solution (F5.1) of the precipitation (P4.1) and washing/filtering (P4.2). However, a too high concentration may have a bad effect on the precipitation process itself. If, for example, both the metal nitrate brine and the NaOH solution are highly concentrated, the solution may become too viscous and the slurry too heavy. This can create process problems or result in a poor quality of the metal hydroxide (F4.2).

Table 2 lists the viscosity of sodium hydroxide solutions (in mP·s) at various concentrations and temperatures. When operating the co-precipitation in a temperature range of 60–70° C., the viscosity of sodium hydroxide appears not to be an issue, even for a sodium hydroxide with a concentration of 16 mol/L. The stress corrosion cracking data in the "Handbook of Corrosion Data" by Bruce D. Craig shows that all stainless steels resist in all concentrations of sodium hydroxide solutions up to about 65° C. Stainless steels types 304 and 316 can be considered resistant below 80° C. Thus, highly concentrated sodium hydroxide can be used in the reactor made from common stainless steels under the aforementioned operation conditions.

ide, optionally with ammonia). The solids are separated from the solution by a filter/washing step (P4.2). The NMC hydroxide is dried (P4.3). The filtered solution is used to recover nitric acid by the alkali nitrate decomposition reaction (P7.1).

Description of Step 5: Ammonia Recycling

If the precipitation step (P4.1) makes use of ammonia or of an ammonium salt (R0.3), the filter solution (F4.1) should not be dumped into the environment. Ammonia is indeed preferably recycled. To achieve a high concentration of $M'NO_3$ (F6.1), it is recommended that the $NH_4OH$ concentration used in the precipitation (P4.1) be high. Steam stripping, allowing for highly concentrated $NH_4OH$ (F4.1), is a therefore the preferred choice.

If the precipitation step (P4.1) is performed ammonia-free, then ammonia recycling is not needed, and this step of recycling can be skipped. This step can also be skipped if only small amounts of ammonia are used. This is because the waste water F6.1 is not dumped, but used as feed for the P7.1 nitrate decomposition step. In this process step, some $NH_4OH$ contamination can indeed be tolerated.

This disclosure provides for a well-designed closed loop for the recycling of the waste solution (F4.1) in a sustainable way. If ammonia (R0.3) or ammonium salts are used in the co-precipitation process (P4.1), ammonia is firstly recycled according to a typical industrial method of stripping, which includes air stripping, and stream stripping. To increase the ammonia stripping efficiency, it might be desired to increase the pH of the waste solution (F4.1) by adding a base (R0.4), for example NaOH. The NaOH does not only enable more efficient ammonia recycling (P5.1), but also it might be beneficial during alkali nitrate decomposition (P7.1) as will be explained later. Air stripping is well suited for waste water with ammonia levels between 10 and 100 mg/l. Higher ammonia contents (more than 100 mg/l) as may be present in waste water or in the solution containing alkali nitrates (F4.1) may necessitate the use of alternate removal techniques (e.g. steam stripping).

The steam stripping process is performed in a randomly packed or trayed column. The influent (waste water after filtration) stream (F4.1) is introduced from the top section of

TABLE 2

| Viscosity in mP · s of NaOH solutions | | | | | | | | | |
|---|---|---|---|---|---|---|---|---|---|
| NaOH (wt. %) | 20° C. | 30° C. | 40° C. | 50° C. | 60° C. | 70° C. | 80° C. | 90° C. | 100° C. |
| 10 | 1.7 | 1.5 | 1.2 | 1.0 | 0.8 | 0.7 | 0.6 | 0.5 | 0.4 |
| 20 | 4.5 | 3.2 | 2.5 | 1.9 | 1.6 | 1.3 | 1.1 | 0.9 | 0.7 |
| 30 | 13.0 | 8.5 | 6.0 | 4.5 | 3.3 | 2.5 | 2.0 | 1.6 | 1.3 |
| 33 | 19.0 | 12.0 | 7.5 | 5.4 | 3.9 | 3.1 | 2.4 | 1.9 | 1.5 |
| 40 | 39.0 | 22.0 | 14.0 | 9.0 | 6.4 | 4.8 | 3.7 | 2.9 | 2.4 |
| 45 | 57.0 | 29.0 | 18.5 | 11.5 | 7.9 | 5.9 | 4.5 | 3.5 | 2.8 |
| 50 | 79.0 | 44.0 | 25.0 | 16.0 | 10.0 | 7.5 | 5.5 | 4.4 | 3.4 |

Preparation of NMC precursors by the prior art sulfate based precipitation process typically requires to addition of a complexing agent like $NH_4OH$. It was observed that the precipitation from a nitrate brine allows to reduce or even eliminate the need for a complexing agent.

In a preferred embodiment, no complexing agent is used, thus reducing the costs. See below, entries EX2-P-01 and EX2-P-02 in Table 4 under Example 1.

In the precipitation step (P4.1), a slurry is obtained comprising a precipitate (a mixed transition metal precursor typically being NMC hydroxide), dispersed in an alkali nitrate solution (alkali nitrate with remaining alkali hydroxcolumn and flows down, while steam flows up the column. The lower-boiling ammonia tends to concentrate in the vapor phase, while the higher-boiling components (water, alkali nitrate and alkali hydroxide) tend to remain in the liquid phase. The ammonia thus gradually concentrates in a vapor phase. The vapor phase can be condensed as a highly concentrated ammonia solution (F5.1) by an overhead condenser, while the alkali nitrate waste water stream (F5.2) is collected at the bottom. After further concentrating (P6.1), the alkali nitrate waste water (F6.1) can be fed to the alkali nitrate decomposition process (P7.1).

The overall separation of ammonia from waste water depends on the relative volatility of ammonia as determined by the pH of the waste water and its temperature, on the number of theoretical plates, and on the ratio of the liquid phase flow rate to the vapor-phase flow rate.

The theory of the stripping process includes the dissociation of ammonia, and the gas-liquid phase equilibrium, where the dissociation of ammonia is defined by the following reaction and equation:

$$NH_4^+ \Leftrightarrow NH_{3(aq)} + H^+;$$ (EQ 12)

$$K'_{NH_4^+} = \frac{[H^+] \cdot [NH_3]}{[NH_4^+]}$$

wherein the value of the dissociation constant ($K'_{NH_4^+}$) is dependent on temperature and pH: the increase of temperature and pH will push the reaction towards dissociation; and wherein the gas-liquid equilibrium refers to mass transfer of ammonia at each equivalent trays according to Henry's law:

$$H = \frac{[NH_3]_{gas}}{[NH_3]_{aq}}$$ (EQ 13)

wherein H is Henry's constant, defined as an intrinsic property of the ammonia/water system and proportionally depending on temperature, $[NH_3]_{gas}$ and $[NH_3]_{aq}$ being the equilibrium ammonia concentrations in the gas and liquid phases, respectively. Thus, in both processes of the dissolution of ammonia and mass transfer of ammonia, higher temperature as well as higher pH can promote the stripping of ammonia from water.

Figure 2A:
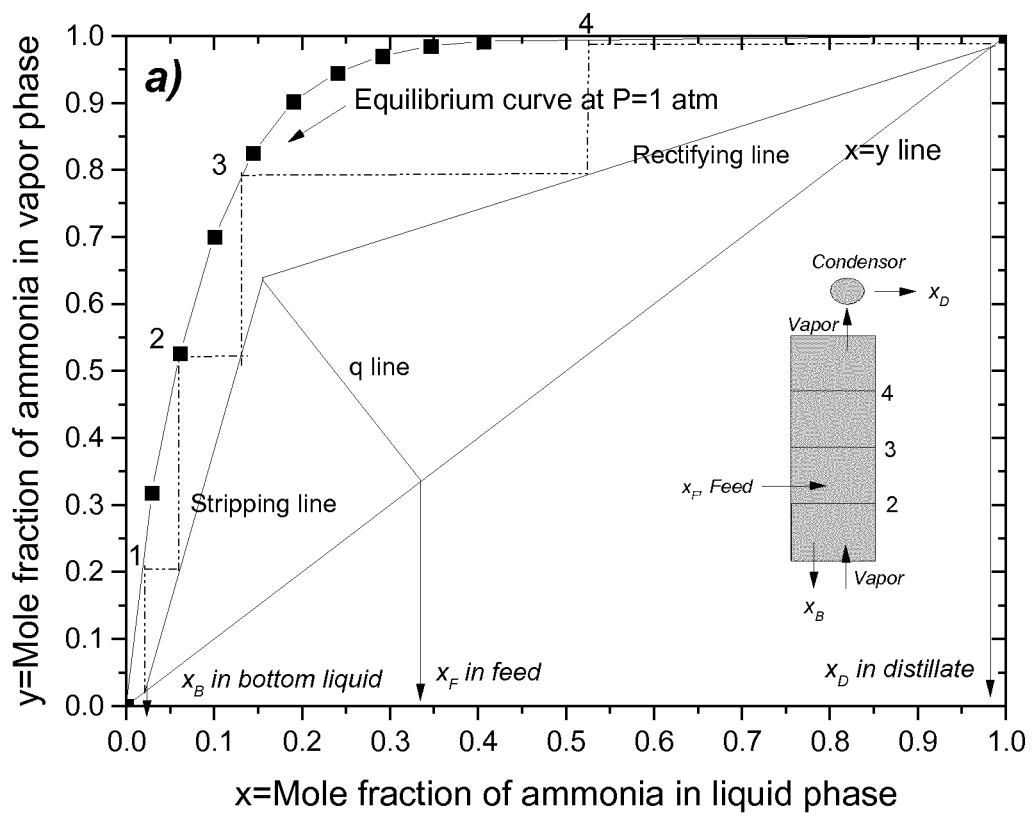
Figure 2B:
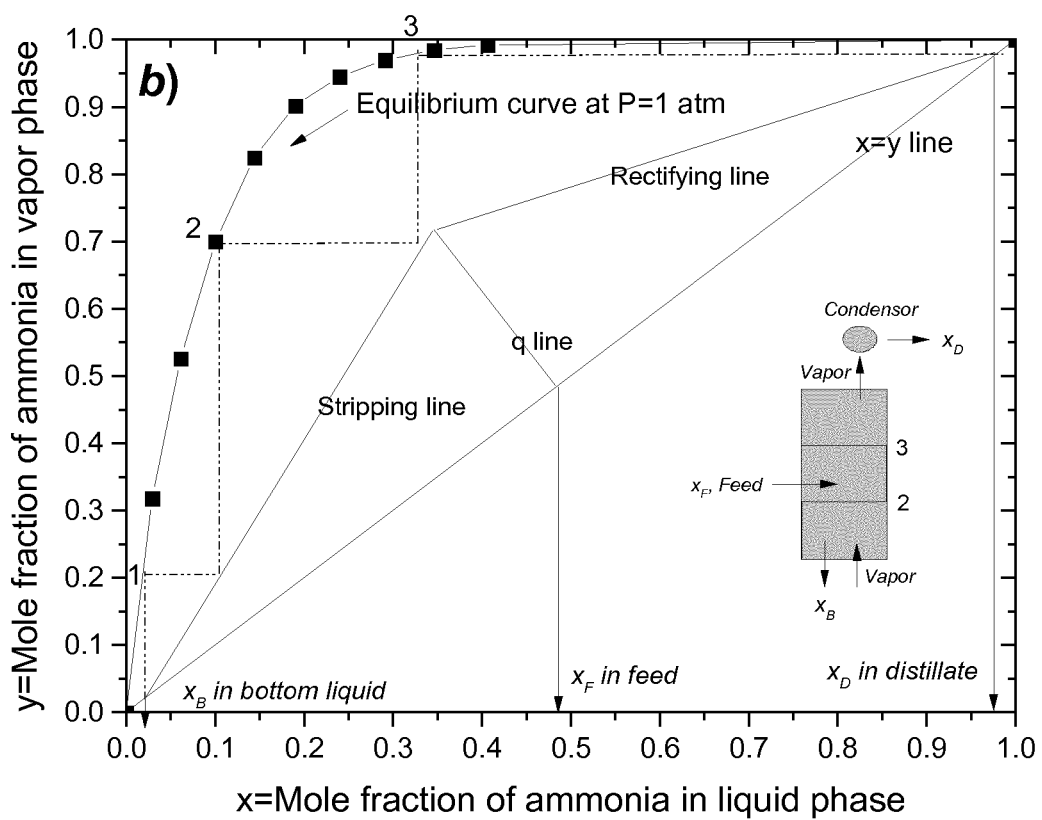

FIG. 2 shows McCabe-Thiele diagrams for the ammonia stripping process, where the vapor-liquid equilibrium of the ammonia-water system at 1 atmosphere is reproduced from "J. Phys. Chem., 1933, 37 (1), pp 101-118". The slope of the rectifying line is determined by the ratio of liquid flow rate to vapor flow rate, and the position of q line is controlled by the concentration of ammonia in feed solution (represented by $x_F$). The target concentrations of ammonia in liquid and vapor after stripping are respectively represented by $x_B$ and $x_D$. The difference between FIG. 2a) and FIG. 2b) is the ammonia content in the feed solution, which results in different numbers of stages or packed units in column. In the plots, stages are represented by dashed lines. A higher ammonia content in the feed solution requires less packed units, thus, shortening the height of the stripping tower and reducing the capital investment. In this disclosure, due to the high solubility of metal nitrates and their super-cooling property, a reduced amount of water is used so that the ammonia concentration is higher when compared to the conventional sulfate-process. In the NO₃ based process of the current disclosure, the water is not discharged but undergoes the additional alkali nitrate decomposition step (P7.1). Because of this the size and cost of the ammonia tower can be lowered.

Description of Step 6: Alkali Nitrate Concentrating, and Step 7: Alkali Nitrate Decomposition Besides ammonia, this invention also provides a recycling process for the alkali nitrate in the waste water. The waste water stream may undergo a pre-treatment by evaporation (P6.1) in order to feed a highly concentrated brine to the decomposition process (P7.1). One way of proceeding is to evaporate water in a hot-wall reactor: the alkali nitrate solutions are fed into the reactor along heated walls, thereby gradually drying and concentrating the brine. A bath of molten salt is obtained where nitrates decompose upon further heating. Concentrated or solid M'NO₃ is thus decomposed, leading to NO$_x$ (F7.2) and to an alkali compound, which can be reacted with water to regenerate an alkali hydroxide (F7.1). This can be re-used as feed (R0.4). Alternatively, and if the feed (R0.4) is NaOH, the alkali could be discharged after having been converted to an environmentally harmless compound.

Due the higher cost of nitric acid (R0.2), the priority is to recycle the nitrates (F6.1) with high efficiency to nitric acid (F1.1).

One approach is the direct decomposition, which schematically can be written as:

$$2NaNO_3 \rightarrow Na_2O + 2NO_2 + \tfrac{1}{2}O_2$$ (EQ14)

Theoretically, molten alkali nitrate can decompose at high temperatures to form alkali oxide and a mixture of oxygen and nitrogen. This reaction has been widely studied and reported, for example in "Int. J. Thermophs. 33, 91 (2012)", "The Journal of Physical Chemistry, 70(11), pp. 3442-3446" and in "The Journal of Physical Chemistry, 77(14), pp. 1810-1813". The authors of above publications clarified that the decomposition of molten sodium nitrate includes two steps. The first step is the conversion of molten sodium nitrate to molten sodium nitrite and oxygen, at temperatures of 450 to 700° C. The second step is the decomposition of molten sodium nitrite into solid sodium oxide, and oxygen and nitrogen, at temperatures above 700° C. Other nitrogen oxide gases can be formed such as NO, NO₂ and N₂O during the second step depending upon the temperature and the atmosphere, as discussed in "J. Phys. Chem. Ref. Data 1 (3) (1972) 747-772". NO and NO₂ can be converted to nitric acid. The alkali oxide can be reacted with water, hereby forming alkali hydroxide. The nitric acid and the alkali hydroxide can be reused in the preparation of NMC hydroxide precursors. The details of the direct decomposition of alkali nitrate will be described in Example 3. The alkali nitrate can be NaNO₃, but also LiNO₃ or KNO₃, leading to the regeneration of LiOH and KOH respectively, which are then reused in the preparation of NMC hydroxide precursors.

Figure 3:
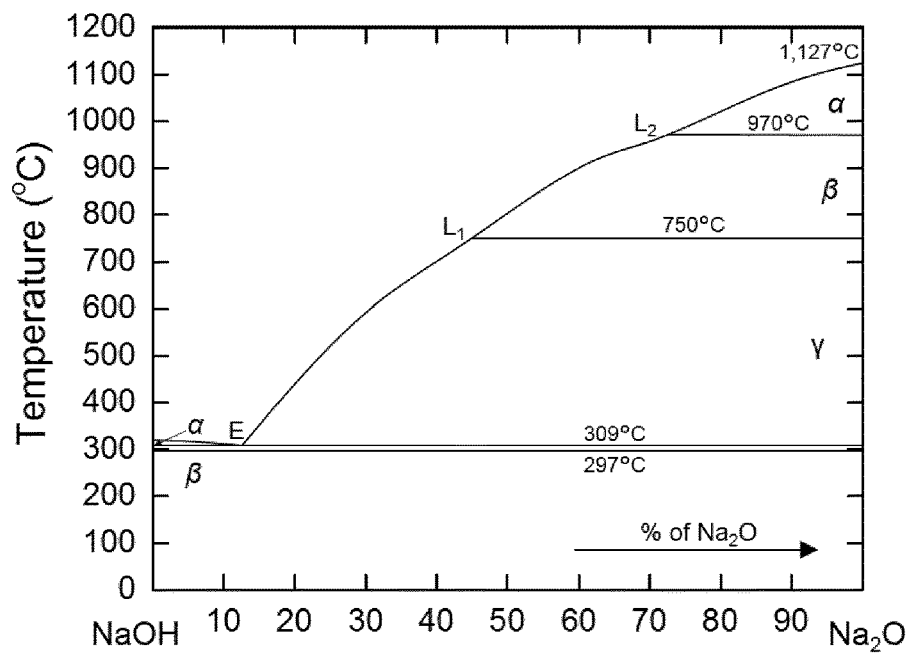

When sodium hydroxide (R0.4) is used in the precipitation step (P4.1), the decomposition of molten sodium nitrate (F6.1) will first result in sodium oxide. Sodium oxide has a melting point above 1000° C. It remains solid in the nitrate decomposition step (P7.1), as this is run at 900° C., or preferably at 600 to 800° C. Sodium oxide can moreover form a crust that will block the further decomposition of sodium nitrate. It is here disclosed that sodium hydroxide can prevent the formation of such a crust by forming a low melting eutectic with Na₂O. The phase diagram of the Na₂O—NaOH system is shown in FIG. 3, according to "C.R. Acad. Sc. Paris 262, Series C, 1051-1054, 1966". When 50% of NaOH is present in the mixture, the melting temperature is lowered to the range of 700 to 800° C., thus there would be no formation of crust during the decomposition of molten sodium nitrate. Moreover, the conversion of sodium oxide into sodium hydroxide can occur violently with incandescence, which is not easily controlled in a scaled-up industrial process. The presence of sodium hydroxide can help to alleviate the violence of the conversion reaction.

Figure 4:
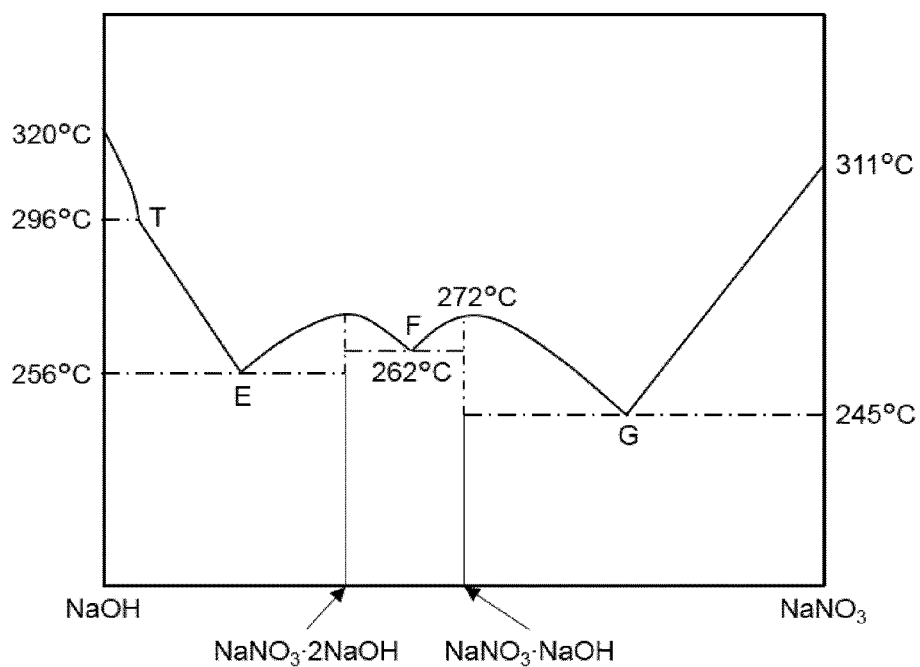
FIG. 4. Phase diagram of NaOH—$NaNO_3$ system, given in "Anal. Obshch. Neorg. Khim. Akad. Nauk SSSR, 25, 212 (1954)"

FIG. 4 shows the phase diagram of NaNO₃—NaOH according to "Anal. Obshch. Neorg. Khim. Akad. Nauk SSSR, 25, 212 (1954)". As shown in the plot, the eutectic composition at point G is 83.2% NaNO$_3$ and 16.8% NaOH with an eutectic temperature at 245° C.

Besides a direct decomposition of NaNO$_3$ into NO$_x$ gas and NaOH or Na$_2$O as described above, other NO$_3$ recycling approaches are possible. The HNO$_3$ used to dissolve or leach the metal precursors is more expensive than the NaOH used in the precipitation reaction. Also, sodium is abundant in nature and of no environmental concern, whereas the release of NO$_3$ or NO$_x$ is a concern indeed. A high recovery yield for NO$_3$ is therefore more important than a high recovery yield for NaOH. Processes with an enhanced recovery of HNO$_3$ are preferred, even if this goes to the detriment of the NaOH recovery. One possibility is to promote the NaNO$_3$ decomposition by adding a reagent, e.g. SiO$_2$, which reacts with NaNO$_3$ according the schematic equation:

$$SiO_2 + 2NaNO_3 \rightarrow Na_2SiO_3 + 2NO_x + \ldots \quad (EQ15)$$

SiO$_2$ (sand) is widely available, and sodium-silicate is a material which can be reused.

Alternatively the decomposition of NaNO$_3$ can be done with chemicals that allow to recover NaOH (F6.1) in a separate step. The following equations explain the concept:

$$2MO_2 + NaNO_3 \rightarrow 2Na_{0.5}MO_2 + NO_x + \ldots \quad (EQ16a)$$

$$2Na_{0.5}MO_2 + H_2O \rightarrow 2H_{0.5}MO_2 + NaOH \quad (EQ16b)$$

$$2H_{0.5}MO_2 \rightarrow 2MO_2 + \ldots \quad (EQ16c)$$

In this case M is typically a transition metal like manganese, iron, titanium oxide etc., which forms sodium compound Na$_x$MO$_2$ when reacting with Na precursor like NaNO$_3$. At least some of the sodium can be extracted into water forming NaOH which is reused in the precipitation reaction. The remaining hydrated metal oxide, which still may contain some sodium, can be transferred to an oxide precursor by heating and is reused to decompose NaNO$_3$ according the reaction EQ16a. Reactions EQ16a and EQ16c can occur simultaneous, in the same reactor.

Description of Step 8: Precursor Roasting, and Step 9: Lithiation and Firing

After the precipitation (P4.1) followed by washing, filtering (P4.2) and drying (P4.3), the obtained NMC precursor (F4.2) might contain residual nitrate. This nitrate is easily burned away during the lithiation firing step (P9.1). The firing takes place at a high temperature, typically above 700° C. in an oxidizing gas. Whereas LiMO$_2$ with a metal composition M=Ni$_{1/3}$Mn$_{1/3}$Co$_{1/3}$ is easily prepared in air, the preparation of compounds with a high Ni content requires firing in oxygen, preferable at high flow rates. During the firing, any residual NO$_3$ will decompose and form NO$_x$. Depending on environmental regulations, it might be required to remove the NO$_x$ from the gas. Especially if the NO$_x$ is diluted, this removal might be difficult and cause additional cost.

Therefore it is preferred to remove the nitrate residual before the lithiation (P9.1). Precursor roasting (P8.1) facilitates this removal. Preferably, the roasting occurs in vacuum or at low gas flow rates. In this case concentrated NO$_x$ (F8.1) is obtained, which can be added as additional feed of the HNO$_3$ recovery process (P1.1). The roasting can be done in inert gas, oxidizing gas or under vacuum. Temperatures need to be sufficiently high to remove a large fraction of the residual nitrate. If the temperature is too high, then the NMC precursor (F8.2) sinters too much and it difficult to achieve a high quality final product (F9.1). Preferably, the precursor roasting (P8.1) and the lithiation process (P9.1) are performed separately.

Common NMC cathode materials are prepared using sulfate precipitation. Typically, some sulfate residual remains in the final cathode material. This sulfur is part of a typical cathode material specification. It is often difficult to change specifications of existing products. It is moreover likely that sulfur improves the performances. Therefore it may be useful to add a sulfur containing additive (R0.6) during the lithiation and firing steps. Similarly, it might be useful to add a chlorine containing additive, as chlorine also may improve the cathode performances Suitable additives are alkali sulfates or bisulfates like Li$_2$SO$_4$, LiHSO$_4$, NaHSO$_4$, sulfur rich salts like Na$_2$S$_2$O$_8$, (NH$_4$)$_2$SO$_4$, transition metal sulfates like CoSO$_4$, S. A typical amount of added sulfur is between 0.1 and 1 mole S per mole of transition metal in the cathode. For Cl, amounts added are between 0 and 1 mole per mole of transition metal.

This invention features an improved process to produce an NMC precursor, particularly a mixed hydroxide precursor, which is more sustainable, creates less waste and also has lower cost in an industrial scale application. This contrasts with the conventional sulfate-based co-precipitation process. The disclosed process implements a closed loop approach co-precipitation method which uses a feed of transition metal nitrate and a feed of alkali hydroxide like NaOH to produce an NMC precursor and alkali nitrate. The transition metal nitrate feed has a high metal concentration, and is typically a pre-mixed solutions of nickel nitrate, cobalt nitrate and manganese nitrate. The metal composition is determined by the target metal composition of the NMC precursor. The nitrate solution and an alkali metal hydroxide solution is fed into a reactor. Optionally, in order to improve the precipitation process, chelating agents like NH$_4$OH are added as well. Typically the feeds are simultaneously introduced into the reactor. The resulting alkali metal nitrate is recycled to produce nitric acid which is re-used to prepare the transition metal nitrate feed. The NMC precursor is used to produce cathode materials for rechargeable lithium batteries by a firing process. The firing process includes the addition of additives like sulfate containing compounds.

In contrast to the conventional sulfate-based co-precipitation process, the nitrate process has the advantage that the solubility of metal nitrates is much higher than that of metal sulfates. Theoretically, nickel sulfate, cobalt sulfate and manganese sulfate have a solubility of approximately 4.2 mol/L, 2.4 mol/L, and 3.9 mol/L respectively, in water at 20° C. Thus, the typical concentration of metal sulfate used in mass production is around 2 mol/L, which results in a production yield of 200 g of metal hydroxide per liter of sulfate solutions. In contrast, nickel nitrate, cobalt nitrate and manganese nitrate have a solubility of approximately 7.6 mol/L, 7.1 mol/L, and 5.1 mol/L respectively, in water at 20° C. Thus, the concentration of metal nitrate can be at least two times higher than that of metal sulfate at 20° C. When temperature rises, the solubility of metal nitrate in water increases much faster compared to metal sulfate. Theoretically, there need no water to be added at all as the hydrated transition metal nitrates form molten salts at relatively low temperatures. Therefore, the production efficiency of metal hydroxide precursors can be at least two times higher by using the nitrate-process. This results in a dramatic reduction of the amount of waste water.

FIG. 1 schematically summarizes the process. The process applies a closed loop concept as wastes from each step are mostly recycled and can be reused for the next cycle of production.

In particular, the nitrogen containing byproducts like nitrogen oxide gases and alkali nitrate solution are efficiently recovered back to the nitric acid and alkali hydroxide.

Description of Analysis Methods

The particle size distribution of metal hydroxide was measured with a Malvern MasterSizer2000.

The tap density (TD) measurement in this invention was carried out by mechanically tapping a graduated measuring cylinder (100 ml) containing the precursor sample (having a mass W, around 60-120 g). After observing the initial powder volume, the measuring cylinder is mechanically tapped for 400 times, so that no further volume (V in cm$^3$) or mass (W) change is observed. The TD is calculated as TD=W/V. The TD measurement is carried out on an ERWEKA instrument.

Nitrogen content and sodium content are measured by LECO nitrogen analyzer and ICP-OES (inductively coupled plasma optical emission spectroscopy) method.

X-ray diffraction and coin cell analysis were performed for the lithiated materials to evaluate the crystal structure and electrochemical property, respectively. The XRD diffraction patterns were collected with a Rigaku X-Ray Diffractometer (D/MAX-2200/PC). The scan speed was set at continuous scanning, at 1 degree per minute. The step-size was 0.02 degree. Scans were performed between 15 and 85 degree. To prevent fluctuations, the room temperature was kept at a constant 24° C.

Coin Cell Analysis was Performed According to the Following Steps:

Step 1) Preparation of a positive electrode: a slurry that contains electrochemical active material, a conductor (Super P, Timcal), a binder (KF #9305, Kureha) and a solvent (NMP, Sigma-Aldrich) was prepared in a high speed homogenizer, where the formulation was 90:5:5. The homogenized slurry was spread on one side of an aluminum foil using a doctor blade coater with a 230 μm gap. It was dried in an oven at 120° C., pressed using a calendaring tool, and dried again in a vacuum oven to remove the solvent completely.

Step 2) Assembling the coin cell: a coin cell was assembled in a glovebox, which is filled with an inert gas (argon). A separator (Celgard) was located between the positive electrode and a piece of lithium foil used as negative electrode. 1M LiPF6 in EC/DMC (1:2) was used as electrolyte, dropped between separator and electrodes.

Step 3) Coin cell testing: the coin cell tests in the present invention follow the procedure shown in Table 3. Each cell was cycled at 25° C. using Toscat-3100 computer-controlled galvanostatic cycling stations (from Toyo). The coin cell testing schedule used a 1 C current of 160 mA/g, and comprised three parts.

Part I is the evaluation of the rate performance at 0.1 C, 0.2 C, 0.5 C, 1 C, 2 C, and 3 C in the 4.3-3.0 V/Li metal window range. With the exception of the first cycle where the initial charge capacity CQ1 and discharge capacity DQ1 were measured in constant current mode (CC), all subsequent cycles featured a constant current-constant voltage during the charge with an end current criterion of 0.05 C. A rest time of 30 minutes for the first cycle and 10 minutes for all subsequent cycles was allowed between each charge and discharge. The irreversible capacity Qirr. is expressed in % as:

$$Q_{Irr.} = \frac{(CQ1 - DQ1)}{CQ1} \times 100\,(\%)$$

The rate performance at 0.2 C, 0.5 C, 1 C, 2 C, and 3 C is expressed as the ratio between the retained discharge capacity DQn, with n=2, 3, 4, 5 and 6 for respectively nC=0.2 C, 0.5 C, 1 C, 2 C and 3 C as follow:

$$nC\ \text{rate} = \frac{DQn}{DQ1} \times 100\,(\%)$$

$$\text{For example, } 3C\ \text{rate (in \%)} = \frac{DQ6}{DQ1} \times 100$$

Part II is the evaluation of the cycle life at 1 C. The charge cutoff voltage was set as 4.5 V/Li metal. The discharge capacity at 4.5 V/Li metal was measured at 0.1 C at cycle 7 and 1 C at cycle 8. Capacity fading at 0.1 C and 1 C were calculated as follows and are expressed in % per 100 cycles:

$$0.1C\ QFad. = \left(1 - \frac{DQ34}{DQ7}\right) \times \frac{1000}{27} \text{in \%/100 cycles}$$

$$1C\ QFad. = \left(1 - \frac{DQ35}{DQ7}\right) \times \frac{1000}{27} \text{in \%/100 cycles}$$

Part III is an accelerated cycle life experiment using 1 C rate for the charge and 1 C rate for the discharge between 4.5 and 3.0 V/Li metal. Capacity fading is calculated as follows:

$$1C/1C\ QFad. = \left(1 - \frac{DQ60}{DQ36}\right) \times \frac{1000}{24} \text{in \%/100 cycles}$$

TABLE 3

| | | Coin cell testing schedule | | | | | | | |
|---|---|---|---|---|---|---|---|---|---|
| | | Charge | | | | Discharge | | | |
| Type | Cycle No | C Rate | End current | Rest (min) | V/Li metal (V) | C Rate | End current | Rest (min) | V/Li metal (V) |
| Part I: | 1 | 0.10 | — | 30 | 4.3 | 0.10 | — | 30 | 3.0 |
| Rate | 2 | 0.25 | 0.05 C | 10 | 4.3 | 0.20 | — | 10 | 3.0 |
| performance | 3 | 0.25 | 0.05 C | 10 | 4.3 | 0.50 | — | 10 | 3.0 |
| | 4 | 0.25 | 0.05 C | 10 | 4.3 | 1.00 | — | 10 | 3.0 |
| | 5 | 0.25 | 0.05 C | 10 | 4.3 | 2.00 | — | 10 | 3.0 |
| | 6 | 0.25 | 0.05 C | 10 | 4.3 | 3.00 | — | 10 | 3.0 |

TABLE 3-continued

Coin cell testing schedule

| Type | Cycle No | Charge | | | | Discharge | | | |
|---|---|---|---|---|---|---|---|---|---|
| | | C Rate | End current | Rest (min) | V/Li metal (V) | C Rate | End current | Rest (min) | V/Li metal (V) |
| Part II: 1 C cycle life | 7 | 0.25 | 0.1 C | 10 | 4.5 | 0.10 | — | 10 | 3.0 |
| | 8 | 0.25 | 0.1 C | 10 | 4.5 | 1.00 | — | 10 | 3.0 |
| | 9~33 | 0.50 | 0.1 C | 10 | 4.5 | 1.00 | — | 10 | 3.0 |
| | 34 | 0.25 | 0.1 C | 10 | 4.5 | 0.10 | — | 10 | 3.0 |
| | 35 | 0.25 | 0.1 C | 10 | 4.5 | 1.00 | — | 10 | 3.0 |
| Part III: 1 C/1 C cycle life | 36~60 | 1.00 | — | 10 | 4.5 | 1.00 | — | 10 | 3.0 |

The process is further illustrated in the following examples.

Example 1: Special Properties of the Metal Nitrate Brine

Figure 5:
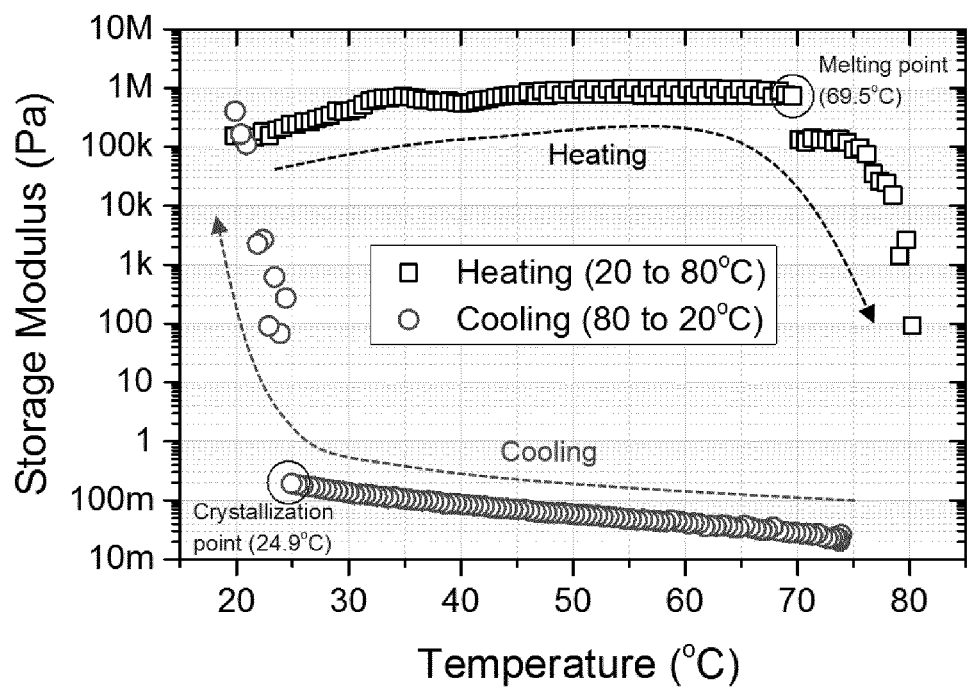
FIG. 5. Storage modulus G' of metal nitrate solution with the concentration of 8 mol/L as a function of temperature during heating and cooling FIG. 6. SEM images for (a) EX2-P-02 and (b) EX2-P-10

To determine the melting point and crystallization point of metal nitrate brine with concentration of 8 mol/L, metal nitrate brine was heated up to 80° C. at a rate of 7° C. per minute, than cooled down to 20° C. at a rate of 6° C. per minute. The molar ratios of Ni, Mn, and Co to metal is 60%, 20%, and 20%, respectively. During the temperature cycle, the dynamic modulus was measured. FIG. 5 shows the storage modulus as a function of temperature. A high storage modulus means that the material has more solid-like properties, which is undesired for the industrial process. During the heating, the storage modulus starts to decrease at 69.5° C., meaning that the metal nitrate brine starts to melt and it dramatically decreases at 80° C. During cooling, surprisingly, the storage modulus does not increase until 25° C. It suddenly increases when the temperature goes below 24.9° C., which is the indication of crystallization. Utilizing this hysteresis upon heating and cooling, referred to super-cooling, allows to utilize very highly concentrated metal nitrate brines for the industrial precipitation process. For example, if a highly concentrated metal nitrate brine is heated up to 80° C. and then cooled to around 30° C., it can be stored for some time and transferred through pipes to the precipitation reactor without crystallizing. This reduces the cost and complexity of industrial precipitation.

Example 2: Nitrate-Based Co-Precipitation Process

A 10 mol/L sodium hydroxide solution was prepared by dissolving sodium hydroxide in deionized water. A mixed metal nitrate solution with concentration 4 mol/L was prepared as well, where the metals consists of Ni, Mn, and Co in a molar ratio of 60%, 20%, and 20%, respectively. The precipitation was carried out in a 10 L stirred tank reactor. The precipitation process for metal hydroxide is mainly controlled by the following parameters: stirring speed of impeller (energy for agitation), temperature, residence time, metal concentration, OH/M molar ratio, and $NH_3$/M molar ratio.

The sodium hydroxide solution and the metal nitrate solution were pumped into a reactor keeping constant flow ratio with various OH/M, $NH_3$/M molar ratio and resident time. Overflowing slurry from the reactor was collected, and a solid-liquid separation was performed using a press filler. The obtained solid metal hydroxide was washed with deionized water several times until the conductivity of the filtered water dropped below 500 μS/m.

Table 4 shows the product property as functions of various precipitation conditions. Generally, the desired high quality metal hydroxide could be obtained starting from a metal nitrate solution with a concentration of 4 mol/L. Generally, the obtained $M(OH)_2$ is similar to a commercial metal hydroxide produced by sulfate process at a concentration of 2 mol/L (e.g. CEX2-SP; Cellcore PHX12 supplied by Umicore). When applying an OH/M ratio of less than 2.0, the D50 particle size of less than 15 μm was obtained.

Figure 6A:
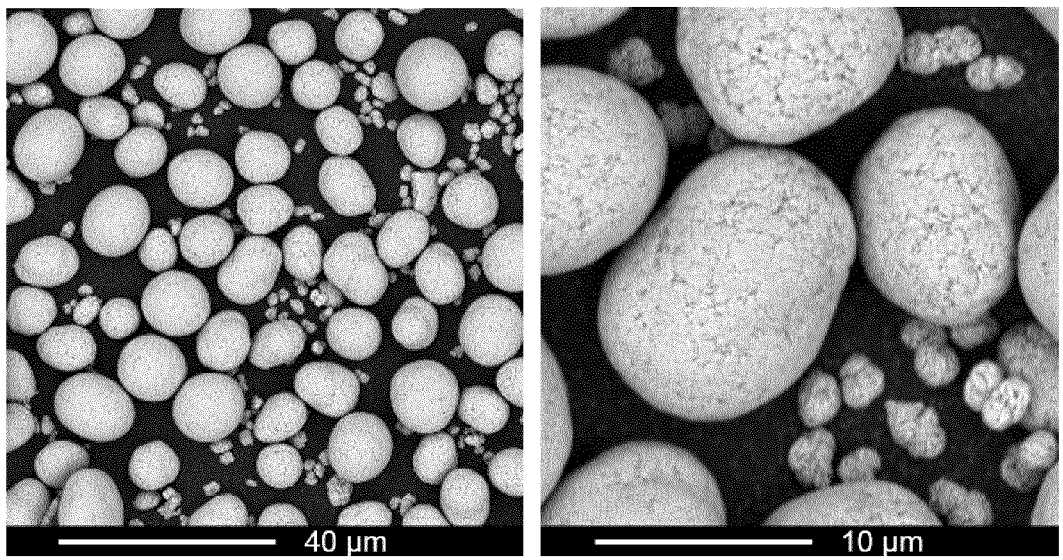
Figure 6B:
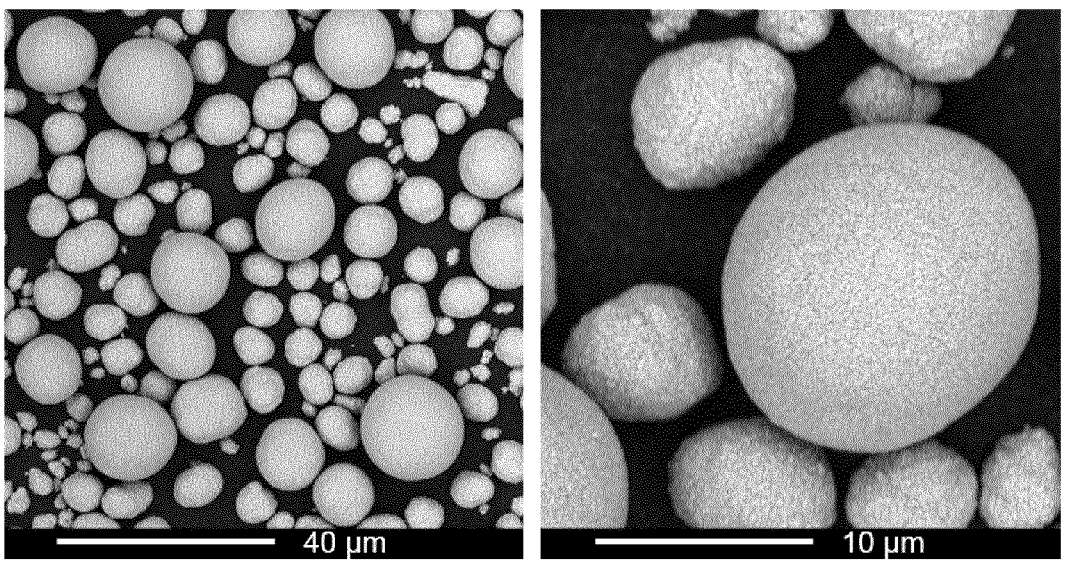

Whereas the sulfate process hardly allows to achieve a good $M(OH)_2$ without adding ammonia as chelating agent, an ammonia free $NO_3$ process is demonstrated, cf. EX2-P-01 and EX2-P-02 in Table 3. The morphology of a so obtained product is shown in FIG. 6.(a). It indicates that a suitable product is easily obtained, even though the tap density is not as high as when using ammonia.

EX2-P-10 was obtained using ammonia. Its morphology and physical properties are shown in Table 4 and FIG. 6.(b). It is concluded that EX2-P-10 is a proper precursor of cathode material in terms of tap density, particle size distribution, and sphericity. Moreover, the measured ammonia content in the filtrate solution after the precipitation process for EX2-P-10 is 2.55 g/l, which is a suitable amount for steam stripping.

TABLE 4

Metal hydroxides from nitrate process with various co-precipitation conditions (using metal nitrate with concentration of 4 mol/L)

| Product ID | Precipitation condition | | | | | Analysis result | | | | |
|---|---|---|---|---|---|---|---|---|---|---|
| | OH/M | $NH_3$/m | Resident time (hours) | RPM | Temp. (° C.) | D50 (μm) | span | Tap density (g/cm³) | N (ppm) | Na (ppm) |
| CEX2-SP | Commercial $M(OH)_2$ product produced by sulfate process | | | | | 11.9 | 1.26 | 2.45 | / | 43 |

TABLE 4-continued

Metal hydroxides from nitrate process with various co-precipitation conditions (using metal nitrate with concentration of 4 mol/L)

| | Precipitation condition | | | | | Analysis result | | | | |
|---|---|---|---|---|---|---|---|---|---|---|
| Product ID | OH/M | $NH_3$/m | Resident time (hours) | RPM | Temp. (° C.) | D50 (μm) | span | Tap density (g/cm$^3$) | N (ppm) | Na (ppm) |
| EX2-P-01 | 1.97 | 0.00 | 2.0 | 1000 | 80 | 8.8 | 0.75 | 0.80 | 7900 | 10 |
| EX2-P-02 | 2.26 | 0.00 | 3.0 | 1000 | 90 | 16.2 | 1.30 | 1.57 | 4400 | 10 |
| EX2-P-03 | 1.97 | 0.30 | 2.0 | 1000 | 60 | 13.9 | 1.34 | 2.41 | 3200 | 140 |
| EX2-P-04 | 1.97 | 0.60 | 2.0 | 800 | 60 | 13.8 | 1.46 | 2.40 | 2600 | 140 |
| EX2-P-05 | 1.97 | 0.60 | 2.0 | 1000 | 60 | 13.0 | 1.30 | 2.43 | 2400 | 170 |
| EX2-P-06 | 1.97 | 0.60 | 1.0 | 1000 | 60 | 9.6 | 1.34 | 2.35 | 2700 | 170 |
| EX2-P-07 | 1.95 | 0.60 | 1.0 | 1000 | 60 | 9.7 | 1.34 | 2.19 | 2700 | 230 |
| EX2-P-08 | 1.97 | 0.60 | 3.0 | 800 | 60 | 16.7 | 1.47 | 2.35 | 2300 | 140 |
| EX2-P-09 | 1.97 | 0.60 | 1.5 | 800 | 60 | 12.0 | 1.35 | 2.38 | 2500 | 150 |
| EX2-P-10 | 1.97 | 0.60 | 1.5 | 1000 | 60 | 11.4 | 1.29 | 2.42 | 2700 | 340 |
| EX2-P-11 | 1.97 | 0.90 | 3.0 | 800 | 60 | 13.6 | 1.33 | 2.18 | 1500 | 130 |
| EX2-P-12 | 2.00 | 0.90 | 3.0 | 800 | 60 | 8.6 | 1.34 | 2.15 | 1600 | 61 |
| EX2-P-13 | 2.04 | 0.90 | 3.0 | 800 | 60 | 8.5 | 1.42 | 2.02 | / | 99 |

One possible concern for metal hydroxides precipitated from nitrate solutions is their relatively high nitrogen content amounting to 2000 to 3000 ppm. This may have an undesired influence on cathode material. EX2-P-14 in Table 5 is such a product. A mild heating step at up to 500° C. can be applied to decomposed the nitrates. The evolving $NO_x$ which can be recycled for the preparation of acid.

TABLE 5

Nitrogen content in metal hydroxide from nitrate process as a function of drying temperature in air

| Product ID | Drying temperature (° C.) | N (ppm) |
|---|---|---|
| EX2-P-14 | | 2900 |
| EX2-P-14A | 150 | 3000 |
| EX2-P-14B | 200 | 2900 |
| EX2-P-14C | 300 | 1400 |
| EX2-P-14D | 350 | 500 |
| EX2-P-14E | 400 | 500 |
| EX2-P-14F | 800 | <5 |
| EX2-P-14G | 900 | <5 |
| EX2-P-14H | 1000 | <5 |

To verify the feasibility of using metal hydroxide from the nitrate process as a precursor of NMC cathode material, selected metal hydroxides (EX2-P-05 and EX2-P-10 in Table 4) were lithiated to form NMC cathode material ($Li_{1-x}(Ni_{0.6}Mn_{0.2}Co_{0.2})_{1+x}O_2$) using different lithium sources, synthesis temperatures, times, and additives. The lithiation process was performed according to the following steps:

Step 1) Blending metal hydroxide and a lithium source (e.g. $Li_2CO_3$ or LiOH) using a tubular mixer in a 250 ml PP bottle;

Step 2) Heating the blend in a chamber furnace at high temperature, where 30 g of blend is placed in an alumina tray and atmosphere is oxidizing gas like air;

Step 3) Post treatments, including crushing and screening with a 270 mesh sieve.

CEX2-NMC is a commercial NMC622 grade (Cellcore HX12 supplied by Umicore), which can be a reference material synthesized by metal hydroxide from a sulfate co-precipitation process. EX2-NMC-01 and EX2-NMC-02 were synthesized by metal hydroxides (EX2-P-05 and EX2-P-10, respectively) from the nitrate co-precipitation process with $Li_2CO_3$ as Li source, where relatively lower sintering temperatures (860° C.) and long sintering time (20 hours after reaching 860° C.) were used since $Li_2CO_3$ requires long equilibrium time. Generally, sulfur in a cathode material can play an important role on electrochemical performance. Sulfur will transform into lithium sulfate after reaction with the lithium source and stay on the particle surface of cathode material. Too much lithium sulfate will cause a loss of charge capacity, which is not preferred.

Figure 7:
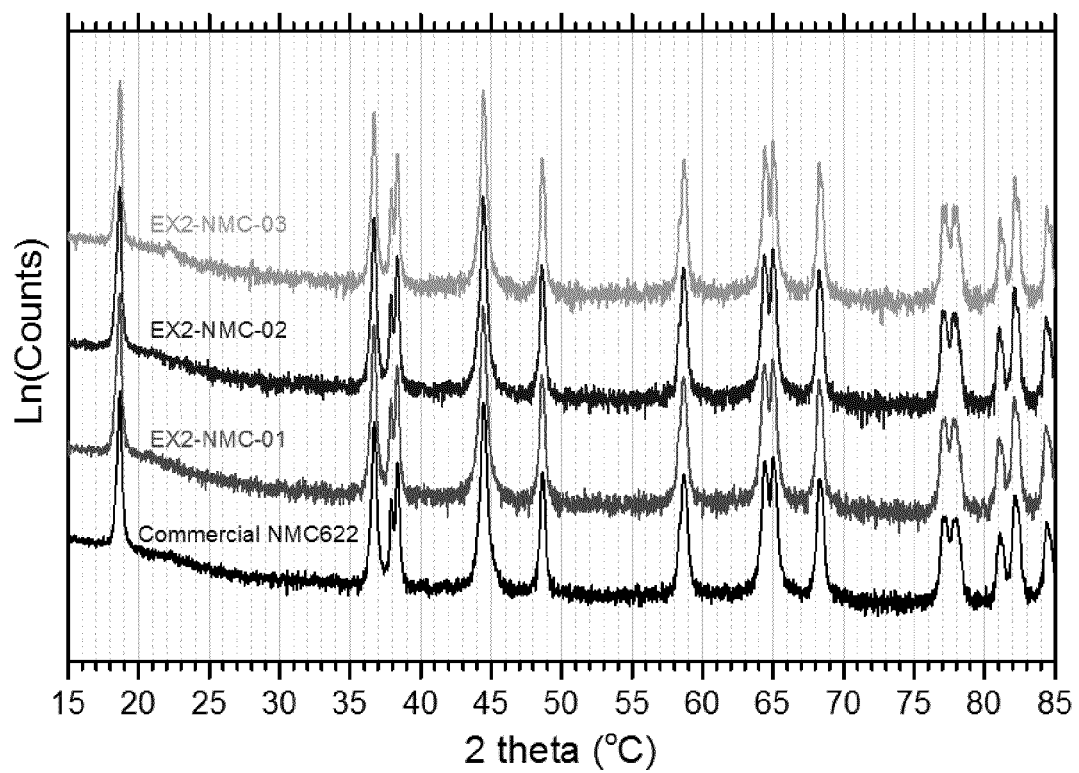
FIG. 7. XRD patterns of NMC cathode materials

However, a certain amount of lithium sulfate covering the particle surface could protect grain boundaries, avoiding particles from cracking during lithium extraction and insertion. Since the NMC synthesized using metal hydroxide from nitrate process has very low sulfur content compared to that from sulfate process, sulfur can be added during lithiation. EX2-NMC-03 was synthesized using LiOH as a Li source and 0.5 mol % (vs. M) of $Li_2SO_4$ as sulfur source, using a relatively short sintering time (10 hours after reaching 870° C.). The target Li/M molar ratio for all the products in this example is 1.035. FIG. 7 shows the XRD pattern of NMC products, which indicates that all products have the right crystal structure basically free of impurities. Table 6 shows the electrochemical properties of coin cells. By adjusting the lithiation conditions, a decent NMC product (EX2-NMC-03), with electrochemical properties comparable to those of commercial NMC (CEX2-NMC) was be obtained.

TABLE 6

Electrochemical property of NMC cathode materials synthesized by metal hydroxide from nitrate process

| | Lithiation condition | | | | Coin cell analysis | | | | |
|---|---|---|---|---|---|---|---|---|---|
| | | | | | | | 3 C | 0.1 C | 1 C | 1 C/1 C |
| Product ID | $M(OH)_2$ | Li source | Temp. (° C.) | Time (Hour) | DQ1 (mAh/g) | Qirr. (%) | rate (%) | QFad. (%) | QFad. (%) | QFad. (%) |
| CEX2-NMC | | Commercial NMC622 | | | 177.5 | 10.6 | 87.2 | 3.6 | 9.2 | 21.8 |
| EX2-NMC-01 | EX2-P-05 | $Li_2CO_3$ | 860 | 20 | 174.6 | 12.3 | 87.3 | 11.7 | 18.7 | 42.8 |
| EX2-NMC-02 | EX2-P-10 | $Li_2CO_3$ | 860 | 20 | 176.3 | 11.9 | 87.6 | 12.7 | 19.3 | 45.9 |
| EX2-NMC-03 | EX2-P-10 | LiOH | 870 | 10 | 176.9 | 9.4 | 88.0 | 5.2 | 9.1 | 20.9 |

Example 3: Decomposition of Molten Alkali Nitrates in Step 6

After the precipitation (P4.1) or ammonia stripping (P5.1), alkali nitrate with alkali hydroxide impurity remains in solution as a byproduct. This example suggests a way to recycle molten metal nitrate after water evaporating (P6.1).

Figure 8:
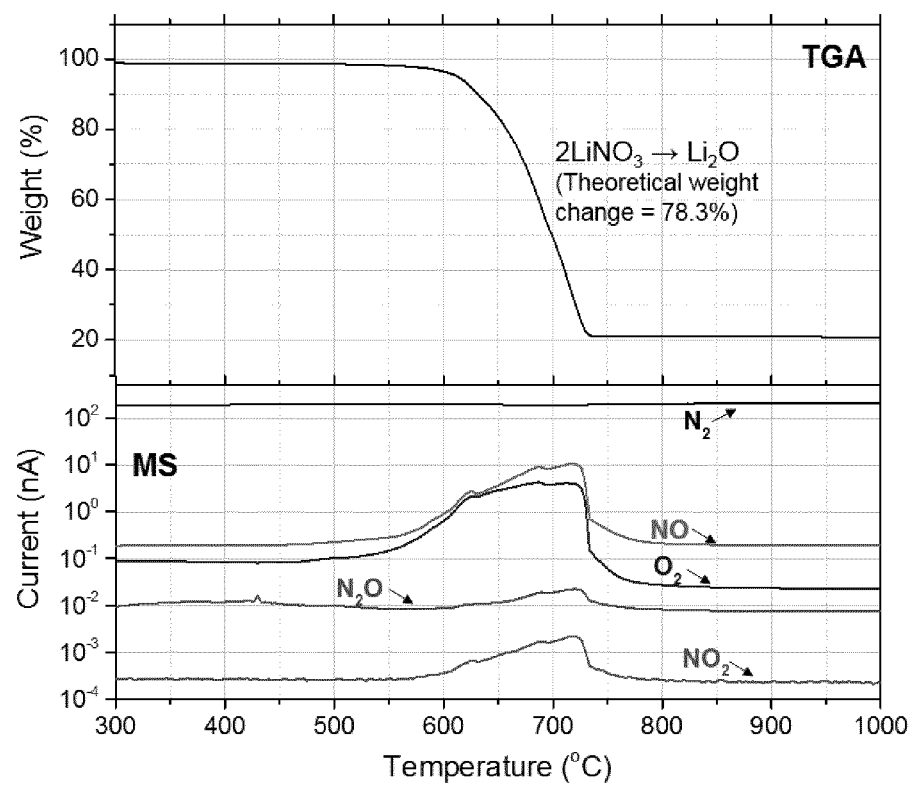
FIG. 8. TGA and MS measurement during decomposition of $LiNO_3$ under $N_2$ atmosphere FIG. 9. Gas mass spectrometry during decomposition of $NaNO_3$ under Ar atmosphere

Based on a TGA experiment performed under $N_2$, it has been found that the lithium nitrate, a byproduct when lithium hydroxide is used in the precipitation (P4.1), can be decomposed at a temperature of 600 to 750° C., thereby forming $Li_2O$. FIG. 8 shows the result of a TGA-MS measurement during decomposition of lithium nitrate under $N_2$ atmosphere. The following reaction is observed:

$$2LiNO_3 \rightarrow Li_2O + 2NO + 3/2O_2 \qquad (EQ17)$$

The NO in EQ5 can be recovered to form nitric acid, and $Li_2O$ can be reacted with water to form LiOH. Both products can be recycled. Depending on temperature and atmosphere, some undesired $N_2$ gas might also be generated instead of NO.

When sodium hydroxide is used as a base source in the precipitation step (P4.1), sodium nitrate is formed as a byproduct. Sodium nitrate decomposes in two steps. The first step is according to:

$$2NaNO_3 \rightarrow 2NaNO_2 + O_2 \qquad (EQ18)$$

In a second step, $N_2$, $O_2$, and different type of $NO_x$ gases can be generated by decomposition of $NaNO_3$ depending on heating temperature and atmosphere. $NO_x$ is preferred as it allow to close the loop after conversion to nitric acid, which conversion is not possible when $N_2$ is formed.

Figure 9:
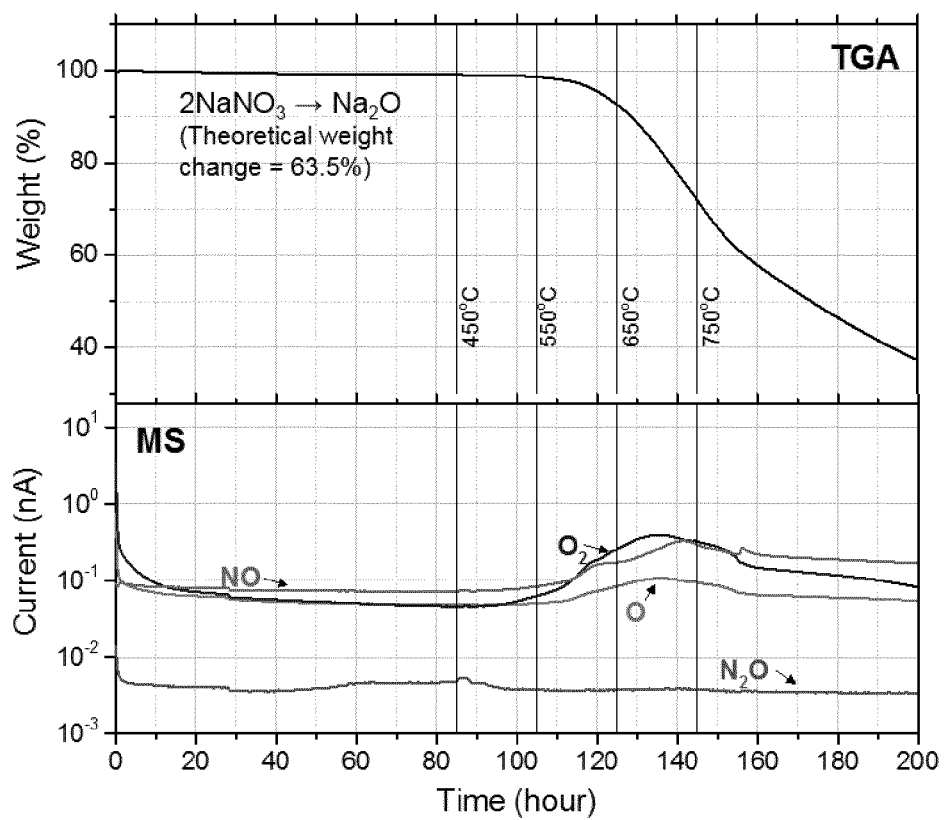

FIG. 9 shows a TGA-MS result during decomposition of sodium nitrate, when sodium nitrate was heated up to 750° C. with a heating ratio of 5° C. per a minute in a Pt crucible under Ar atmosphere. Once the temperature of 750° C. was reached, it was kept constant for the rest of the experiment. It is observed that $O_2$ and NO are mainly formed. The formation of $N_2$ is not observed. This is both remarkable and beneficial as this would otherwise lead to a decrease of the $HNO_3$ regeneration yield. A simple integration of the curves indicates that sodium nitrate is fully decomposed.

Alternatively, adding silica ($SiO_2$) could decrease the decomposition temperature of alkali nitrates thanks to the stabilization of the alkali as a silicate (e.g. $Na_2SiO_3$). Since silicates are generally inert, they can be considered as an acceptable solid waste. It has indeed been found that the decomposition reaction below (EQ7) is almost completed at 700° C., delivering $Na_2SiO_3$ and $Na_2Si_2O_5$ products that are very crystalline based on X-ray diffraction analysis.

$$2NaNO_3 + SiO_2 \rightarrow Na_2SiO_3 + 2NO + 3/2O_2 \qquad (EQ19)$$

The drawback of this alternative is that alkali hydroxide cannot be formed and recycled.

Example 4: Decomposition of Pure $NaNO_3$ and $HNO_3$ Regeneration 500 g of $NaNO_3$ are placed in an alumina crucible. This crucible is heated in an electrical furnace, to a temperature of 875° C., for 5 hours.

Air is introduced in the furnace at a flowrate of 10 $l \cdot min^{-1}$. This air flow carries the $NO_x$ compounds generated by the decomposition to an absorption system.

The absorption system consists of an oxidation vessel with a 10 liter capacity, followed by two $NO_x$ packed bed scrubbers with a diameter of 0.1 m and a packing height of 1 meter.

In the oxidation vessel, $O_2$ is mixed with the furnace gas in a 10 liter vessel, cooled to 40° C. The $O_2$ flowrate is maintained at 3 L/min. The residence time in the oxidation vessel allows to oxidize $NO_x$ compounds according to EQ1 above.

Both scrubbers have a liquid storage vessel at their bottom that hold 10 L of $HNO_3$ solution each. These are maintained at 40° C. by cooling coils inside each vessel.

The $HNO_3$ solution is circulated over the packed bed.

At the start of the scrubbing operation, the storage vessel of the first scrubber is filled with 10 liter 50% $HNO_3$ solution (10.4 mol/L $HNO_3$) and the second scrubber is filled with 10 liter 20% $HNO_3$ solution (3.5 mol/L $HNO_3$). At the start, 100 mL $H_2O_2$ (35% solution) is added to each scrubber.

During the scrubbing operation, 50 mL $H_2O_2$ solution is added to the first scrubber at 30 minute intervals until the total quantity of $H_2O_2$ added the first scrubber reaches 500 mL. In the second scrubber, 25 ml $H_2O_2$ solution is added at 30 minute intervals until the total quantity of $H_2O_2$ added to the second scrubber reaches 250 mL.

During operation, the temperature of the circulating $HNO_3$ is maintained below 40° C. by a cooling coil inside the liquid storage vessels.

More than 90% of the nitrate in the feed is recovered as $HNO_3$ in the gas scrubbers. No significant concentration of $NO_x$ is detected in the off-gas of the second scrubber. It is concluded that only 10% or less of the nitrate in the feed is lost for the regeneration of $HNO_3$.

The concentration of $HNO_3$ at the end of the operation amounts to 10.4 mol/L in the first scrubber, and 3.6 mol/L in the second scrubber. Accounting for the volume increase due to the introduction of $H_2O$ by $H_2O_2$, it is concluded that 72% of the nitrate is recovered in the first scrubber and 18% in the second scrubber.

The same apparatus, when operated as a continuous process, would therefore yield a nitric acid concentration of 10.4 mol/L (50%), which is fully compatible with the preferred requirements of the leaching step.

It is moreover believed that industrial scale realizations of this process will lead to even higher nitric acid conversion yields, such as 95 or even 99%. Indeed, little or no nitrogen loss in the form of $N_2$ has been observed during the denitrification step.

Moreover, industrial realization rely exclusively on $O_2$ for the oxidation, thus avoiding the dilution caused by the use of $H_2O_2$ solution as an oxidizing agent. It is therefore reasonable to expect acid concentrations of more than 13 mol/L (65%).

This Example illustrates the conversion of gases from the alkali nitrate decomposition (step 7, Stream F7.2), because this step is expected to be responsible for the bulk of the $NO_x$. It should be noted that any $NO_x$ bearing gases originating from the metal leaching (step 2, stream F1.1) or from the optional precursor roasting (step 8, stream F8.1) may be recycled using the same means and with the same yield as in this example.

Example 5: Regeneration of NaOH

The crucible of Example 4 is cooled down to room temperature under air, and weighed. The observed mass loss is 56.7%. The white residual solid in the crucible is analyzed by XRD, and consists of $Na_2O$ with some $Na_2CO_3$. No residual nitrate or nitrite is observed, indicating the complete decomposition of the nitrate. The presence of $Na_2CO_3$ is due to the reaction of the $Na_2O$ with $CO_2$ in air, and explains why the mass loss is lower than the theoretical value for the decomposition to pure $Na_2O$.

This conversion to a carbonate can be avoided when working in a system flushed with nitrogen. In that case, the decomposition product is $Na_2O$ only, which can readily be converted to NaOH by dissolution in water.

Example 6: Decomposition of $NaNO_3/SiO_2$ Mixture and $HNO_3$ Regeneration

A mixture of 243 g $NaNO_3$ and 257 g $SiO_2$ (500 g in total) is placed in an alumina crucible. This crucible is heated in an electrical furnace, to a temperature of 793° C., for 2 hours.

The off-gases are captured in the same equipment, at the same initial conditions as in Example 4. In this case, 100 mL $H_2O_2$ 35% is added to each scrubber at the start of the operation, followed by the addition of 50 mL at 30 minute intervals until 300 mL $H_2O_2$ is added to the first scrubber. To the second scrubber, 25 mL is added at 30 minute intervals until 150 mL is added in total.

Also in this case, more than 90% of the nitrate content is recovered as $HNO_3$.

The invention claimed is:

1. A process for the preparation of a metal-bearing precursor for the synthesis of cathode material suitable for secondary lithium-based batteries, comprising the steps of:
    leaching one or more metals and/or metal compounds using $HNO_3$ in an aqueous solution, thereby producing an aqueous solution containing metal nitrates, and, optionally, a first gaseous phase containing $NO_x$, which is separated;
    precipitating a precursor from the solution containing metal nitrates using an alkali hydroxide or carbonate in an aqueous solution, thereby producing a solution containing alkali nitrates, and a solid phase containing the metal-bearing precursor, which is separated, and optionally washed;
    decomposing the alkali nitrates in the solution containing alkali nitrates, thereby producing a solid or liquid phase containing the alkali, and a second gaseous phase containing $NO_x$, which is separated; and
    regenerating $HNO_3$ using the first and second $NO_x$ gaseous phases separated in the steps of leaching and of decomposition, and recycling the $HNO_3$ to the step of leaching.

2. The process according to claim 1, wherein, in the step of metal leaching, the metals and/or metal compounds comprise one or more metals selected from the group consisting of nickel, manganese, and cobalt.

3. The process according to claim 1, wherein, in the step of metal leaching, the metals and/or metal compounds comprise metallic compounds, alloys, oxides, or hydroxides.

4. The process according to claim 1, wherein, in the step of metal leaching, the $HNO_3$ in aqueous solution is concentrated to at least 50%.

5. The process according to claim 1, wherein, in the step of metal leaching, the aqueous solution containing metal nitrates has a metal concentration of at least 4 mol/L.

6. The process according to claim 1, wherein the solution containing metal nitrates is subjected to a step of concentrating by evaporation of water, thereby obtaining a brine containing metal nitrates, which can be further processed in the step of precursor precipitation.

7. The process according to claim 1, wherein, in the step of precursor precipitation, the alkali hydroxide or carbonate is selected from the group consisting of NaOH, $Na_2CO_3$, KOH, $K_2CO_3$, and LiOH or mixtures thereof, in a solution or slurry containing at least 4 mol/L of alkali.

8. The process according to claim 1, wherein, in the step of precursor precipitation, one or both of the solution containing metal nitrates, and the alkali hydroxide or carbonate in an aqueous solution, are pre-heated to a temperature of at least 30° C.

9. The process according to claim 1, wherein, in the step of precursor precipitation, the solution containing alkali nitrates is maintained at a temperature of at least 30° C.

10. The process according to claim 1, wherein the step of precursor precipitation is performed in ammonia-free conditions.

11. The process according to claim 1, wherein, in the step of precursor precipitation, an ammonium compound is added as complexing agent, wherein the ammonium compound is selected from ammonia or ammonia salts.

12. The process according to claim 11, wherein the solution containing alkali nitrates is subjected to a step of ammonia recovery, thereby producing an ammonia-free solution containing alkali nitrates, and an ammonium compound, which is separated, and optionally recycled to the step of precursor precipitation.

13. The process according to claim 1, wherein the solution containing alkali nitrates is subjected to a step of concentrating by water evaporation, thereby obtaining a brine containing alkali nitrates with at least 4 mol/L of alkali, which is further processed in a step of alkali nitrate decomposition.

14. The process according to claim 1, wherein the solid or liquid phase containing the alkali comprises an alkali oxide, which is reacted to alkali hydroxide or carbonate, and recycled to the step of precursor precipitation.

15. The process according to any claim 14, wherein the alkali hydroxide or carbonate is NaOH, and the alkali oxide is $Na_2O$, which is reacted with water for the regeneration of NaOH.

16. The process according to claim 1, wherein, in the step of alkali nitrate decomposition, $SiO_2$ is added to the brine containing alkali nitrates, thereby producing a solid phase containing the alkali comprising alkali silicates.

17. The process according to claim 1, wherein the amount of $HNO_3$ obtained in the step of $HNO_3$ regeneration corresponds to at least 50% of the $HNO_3$ consumed in the step of metal leaching.

18. The process according to claim 1, wherein the solid phase containing the metal-bearing precursor is subjected to a step of roasting at a temperature of 200 to 700° C., thereby producing a nitrate-free solid phase containing the metal-bearing precursor, and a third gaseous phase containing $NO_x$, which is separated.

19. The process according to claim 18, wherein, the third gaseous phase containing $NO_x$ is fed to the $HNO_3$ regeneration step, along with the first and second $NO_x$ gaseous phases.

20. The process according to claim 1, wherein the solid phase containing the metal-bearing precursor is blended with a source of lithium, and optionally with a source of sulfur or chlorine, after which it is subjected to a step of lithiation by high-temperature firing, thereby producing the cathode material for use in secondary lithium-based batteries.

21. The process according to claim 20, wherein, in the step of lithiation, a fourth gaseous phase containing $NO_x$ is produced, which is separated.

* * * * *